US011442330B1

(12) United States Patent
Borlaug

(10) Patent No.: US 11,442,330 B1
(45) Date of Patent: Sep. 13, 2022

(54) CIRCUITS AND METHODS FOR CORRECTING DC BIAS AND SUPPRESSING OPTICAL CARRIER FREQUENCY IN ELECTRO-OPTIC MODULATORS

(71) Applicant: The Aerospace Corporation, El Segundo, CA (US)

(72) Inventor: David B. Borlaug, Los Angeles, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 45 days.

(21) Appl. No.: 17/182,938

(22) Filed: Feb. 23, 2021

(51) Int. Cl.
*G02F 1/225* (2006.01)
*G02F 1/21* (2006.01)

(52) U.S. Cl.
CPC .......... *G02F 1/2255* (2013.01); *G02F 1/212* (2021.01)

(58) Field of Classification Search
None
See application file for complete search history.

(56) References Cited

U.S. PATENT DOCUMENTS

| 7,266,306 | B1 | 9/2007 | Harley et al. |
| 7,369,290 | B1 | 5/2008 | Cox et al. |
| 9,217,908 | B2 * | 12/2015 | Kono ............... H04B 10/50572 |
| 10,254,570 | B2 * | 4/2019 | Burke .................. G02F 1/3775 |
| 10,560,195 | B2 * | 2/2020 | Fan ...................... G02F 1/0123 |
| 2007/0212075 | A1 | 9/2007 | Yin |

OTHER PUBLICATIONS

Ackerman, et al., "Effect of pilot tone-based modulator bias control on external modulation link performance." International Topical Meeting on Microwave Photonics MWP: 121-124 (2000). https://dx.doi.org/10.1109/MWP.2000.889802.
Cho, et al., "Closed-Loop Bias Control of Optical Quadrature Modulator." IEEE Photonics Technology Letters 18(21): 2209-2211 (2006). https://dx.doi.org/10.1109/LPT.2006.884759.
Fu, et al., "Mach-Zehnder." IEEE Microwave Magazine 14(7): 102-107 (2013). https://dx.doi.org/10.1109/MMM.2013.2280332.
Sisto, et al., "Carrier-to-Noise Ratio Optimization by Modulator Bias Control in Radio-Over-Fiber Links." IEEE Photonic Technology Letters 18(17): 1840-1842 (2006). https://dx.doi.org/10.1109/LPT.2006.879942.

* cited by examiner

*Primary Examiner* — Rhonda S Peace
(74) *Attorney, Agent, or Firm* — Snell & Wilmer LLP

(57) ABSTRACT

This application relates to circuits and methods for dynamically correcting DC bias and suppressing optical carrier frequency in electro-optic modulators (EOMs). A DC bias voltage for a control path may be determined using a control path DC bias structure. DC bias in a signal path may be corrected by applying the DC bias voltage, or a function thereof, to a signal path DC bias structure. Signal path and control path RF signal structures may be operated for a time period during which their DC biases drift together. An updated DC bias voltage for the control path may be determined using the control path DC bias structure. The drift of DC bias in the signal path may be corrected by applying the updated DC bias voltage, or a function thereof, to the signal path DC bias structure.

21 Claims, 10 Drawing Sheets

CIRCUITS AND METHODS FOR CORRECTING DC BIAS AND SUPPRESSING OPTICAL CARRIER FREQUENCY IN ELECTRO-OPTIC MODULATORS

FIELD

This application relates to electro-optic modulators, such as Mach-Zehnder modulators (MZMs).

BACKGROUND

Electro-optic modulators have been prepared using electro-optical substrates such as lithium niobate ($LiNbO_3$), silicon, and indium phosphide. Lithium niobate forms a crystal structure the lattice structure of which is non-centrosymmetric. In the presence of a DC electric field, this lithium niobate's non-centrosymmetric crystal exhibits a change in the optical refractive index, or dielectric susceptibility, as described by the field of nonlinear optics. Similar modification of the optical refractive index is achieved in silicon, indium phosphide, and other materials via the injection or depletion of electrons, or the modification of electronic band structures, through applied electric fields. Applying an electric field to the electro-optical substrate changes the net polarization and refractive index of the material. Thus, the phase of light propagating through the material may be altered by applying an electric field to the material.

FIG. 1 schematically illustrates a plan view of a previously known circuit 1000 that includes substrate 101 (such as lithium niobate) in which a waveguide is formed, electrodes providing an electro-optic modulator (EOM) 100 including RF signal structure 120, DC bias structure 130, and controller 180. Waveguide 102 may be formed by exchanging protons for some of the lithium ions in the substrate 101 within defined areas, e.g., by immersing the substrate into a solution containing a proton exchange acid, such as benzoic acid. The proton-exchanged areas have a higher extraordinary refractive index than the remainder of the substrate, and so act as a waveguide that transports light through substrate 101 with relatively low loss. In the illustrated circuit 1000, carrier light (carrier input) from a laser is introduced to waveguide 102 through input optical fiber 10. Junction 103 of waveguide 102 divides the light into two portions and respectively guides the light portions into sections 104 and 105 of waveguide 102. In RF signal structure 120, electrodes 121, 122, 123 are positioned on either side of the waveguide sections 104, 105, and separated from the waveguide sections by buffer regions (not labeled). In one example, the respectively closest edges of the electrodes are spaced approximately 10 microns from each other, with sections 104 or 105 therebetween. RF input 181 applies bias voltages to different pairs of electrodes 121, 122, 123 so as to change the phase of the light traveling through the waveguide section 104 or 105 in such a manner as to impose the RF signal onto the light in the form of phase changes that modulate the intensity of the interferometrically combined light in section 109.

Controller 180 is programmed to independently apply bias voltages to different pairs of the electrodes 131, 132, 133, so as to change the phase of the light traveling through the waveguide section 104 or 105. The electrode pairs dedicated to bias voltage control 131, 132, and 133 are shown adjacent to the electrode pairs used by the radio frequency (RF) input 181 as electrodes 121, 122, 123. Note that the bias control voltage can be applied directly to the RF input electrodes 121, 122, 123 if the bias controller 180 uses a device commonly known as a "bias-tee" which combines the RF and bias voltages. However, the "bias-tee" can reduce signal performance characteristics, and is therefore not the preferred control method, and is mentioned here only for completeness. The magnitude of the change in the material's net polarization and the magnitude of the phase change, may be proportional to the applied electric field. The light in sections 104, 105 of waveguide 102 are recombined at junction 108, where they interfere with one another. Because the relative phase of the light portions traveling through waveguide sections 104, 105 may be controlled via controller 180, the intensity of the light at junction 108 and in waveguide section 109 coupled thereto may be modulated as desired. For example, if the portion of light in section 104 is phase delayed by an even multiple of π relative to that in section 105, then the two portions of light will constructively interfere with each other, yielding maximum brightness. Or, for example, if the portion of light in section 104 is phase delayed by an odd multiple of π relative to that in section 105, then the two portions will completely interfere with each other, yielding minimal brightness. Any intensity in between may be selected by suitably adjusting the relative phase delays via bias voltages applied by controller 180. The output of waveguide 102 is coupled into a single output optical fiber 11. Configurations such as that illustrated in FIG. 1 may be referred to as a Mach-Zehnder modulator (MZM).

EOM 100 and RF signal structure 120 have a linear response to changes in the voltages of electrodes 131, 132, 133, e.g., apply an approximately linear phase shift to light traveling through waveguide sections 104 or 105 as a function of the applied bias voltage. However, the physics of the Mach-Zehnder modulator is such that the linear phase shift imparted to the pair of waveguide sections 105 and 105 produces a sinusoidal, or nonlinear, response following optical interference light junction 108. It can be desirable to operate EOM 100 near the quadrature point, which is the mid-way point along the sinusoid where the response curve is approximately linear and a change in the RF input voltage 181 generates a proportional change in output intensity of EOM 100. Because of such linearity, the dynamic range of EOM 100 is largest about the quadrature point, as compared to near the peak or trough of the sinusoid where a change in the RF input voltage 181 will generate a quadratic or strongly nonlinear response in the optical intensity. However, although different sections of waveguide 102 (e.g., waveguide sections 104 and 105) may be formed using a common process as one another and may have nominally the same specifications as one another, slight manufacturing differences may lead to slightly different optical path widths, depths, lengths, and/or indices of refraction. Similarly, although electrodes 131, 132, 133 may be formed using a common process as one another and may have nominally the same specifications as one another, slight manufacturing differences may lead to slightly different electrode thicknesses, widths, and/or distances from waveguide sections 104 and 105 which may result in different electric field strengths within those waveguide sections.

Because of such inconsistencies in waveguide and/or electrode fabrication, as controller 180 applies bias voltages to electrodes 131, 132, and 133, those voltages may not precisely cause the amount of phase shift as expected, and therefore the RF signal may not be precisely modulated as expected. For example, a given voltage that is expected to place EOM 100 at the quadrature point may actually place the EOM in a region of the sinusoid where changes in output intensity of the EOM are nonlinearly related to changes in voltage, and where the dynamic range may be limited. Such errors may be built-in to the performance of EOM 100 during manufacturing, and thus may be considered to be "static." One known way to address such static errors is to calibrate EOM 100 before putting it into service by observing changes in optical intensity resulting from different bias voltages applied to electrodes 131, 132, and/or 133, and selecting and applying to these electrodes an "optimum" applied bias voltage $V_{applied,optimum}$ (also referred to as a "DC bias" or "DC offset" voltage) that places EOM 100 at the quadrature point.

However, EOMs may be susceptible to charge accumulation on the surface of the substrate. For example, charge generation and charge redistribution may occur when a bias voltage is applied to electrodes 131, 132, and/or 133. The bias voltage may cause the movement of mobile charges, in the form of electrons or holes, which may accumulate on the surface near the electrodes and either may counteract the effect of the applied voltage by establishing a positive drift in the bias voltage, or may enhance the applied bias voltage by establishing a negative drift in the bias voltage. Additionally, environmental conditions may dynamically and detrimentally affect EOM performance. For example, the optical path lengths of different sections of waveguide 102 may change over time due to self heating (e.g., absorption of destructively interfering light in the waveguide) and/or due to externally caused warming of substrate 101. Accordingly, the optimum bias voltage applied to the waveguide device may change with time such that the applied bias voltage $V_{applied}$ no longer corresponds to $V_{applied,optimum}$. As a consequence, the outgoing light from the modulator also may deviate from the optimal output over time.

To compensate for drifts in the bias voltage, also known as DC drifts, and thus maintain the optimum bias voltage and optical output, it is common to employ certain types of voltage control circuitry. For example, such DC drifts may be electronically compensated for by monitoring the intensity at output 11 using a separate photodiode (not specifically illustrated in FIG. 1) and adjusting the DC bias applied by electrodes 131, 132, 133 to maintain a fixed optical output power corresponding to the quadrature point. However, if the source of the carrier light (laser) is noisy, or the system architecture in which the modulator is used introduces noise to the carrier light, then the adjustments to the DC bias may inadvertently track that noise instead of the performance of the EOM 100 itself, and thus may further degrade performance of circuit 1000. To rigorously determine the appropriate DC bias to apply—that is, to determine a new $V_{applied,optimum}$—EOM 100 may be temporarily taken out of service and the voltages of pairs of electrodes 131, 132, 133 are varied to calibrate EOM 100 before putting it back into service by observing changes in optical intensity resulting from different bias voltages applied to electrodes 131, 132, and/or 133, and selecting and applying to the electrodes a new optimum applied bias voltage $V_{applied,optimum}$. Alternatively, EOM 100 may remain in service while applying different bias voltages to electrodes 131, 132, and/or 133, but as a result the output signal will be corrupted by the different intensities that are concomitant with determining the new $V_{applied,optimum}$. Additional mechanisms utilize a low-frequency amplitude modulation about the last known $V_{applied,optimum}$ and apply this to electrodes 131, 132, and 133. By dithering the bias voltage around the last known good operating point, an estimation can be made to update $V_{applied,optimum}$. However, due the the modulator's predominantly linear response about the quadrature bias point, the accuracy of the produced estimation update is strongly linked to the magnitude by which the current RF signal is corrupted; for example, a more accurate bias voltage estimation may corrupt the signal more, while less signal corruption may result in a less accurate bias voltage estimation.

As a separate issue, the spectrum of the light modulated by EOM 100 has two primary components. The first is a relatively large, central contribution from the optical carrier (e.g., at 200 THz), and the second is a pair of sidebands corresponding to modulation of the optical carrier by the RF frequency provided at input 181 (e.g., at 200 THz±100 GHz, where 100 GHz is the RF frequency). The optical carrier contribution to the spectrum does not carry information, and as such, suppressing it may increase the signal-to-noise ratio (SNR) for the information-carrying sidebands. However, using currently available filters to attempt to suppress the optical carrier may also suppress all or a portion of one or both of the sidebands, and thus unacceptably diminish the SNR. For example, even though a filter may have a given bandwidth about a central frequency, the optical carrier frequency may drift over time which may reduce the filter's ability to suppress the optical carrier and/or which may cause one of the sidebands to become partially or fully blocked by the filter.

Accordingly, improvements to electro-optic modulators are needed.

SUMMARY

Circuits and methods for correcting DC bias and suppressing optical carrier frequency in electro-optic modulators are provided herein. For example, the presently described circuits and methods may improve the spur-free dynamic-range (SFDR) and signal-to-noise ratio (SNR) of radio-frequency signals imposed on optical carriers by providing a matched pair of electro-optic modulators (EOMs) on a common substrate. One of the matched EOMs is designated for operation in a signal path over which data is transmitted. The other of the matched EOMs is designated in a control path from which precise bias information is extracted. The control path EOM may be exercised with large signal inputs to produce precise bias control information for use with the signal path EOM. By extracting bias information from the control path only, the signal path is able to operate without the SFDR and SNR degrading disturbances that otherwise may be caused by bias keeping. Because data is transmitted via the signal path only, and not on the control path, large signal deviations input to the control path bias may not produce any negative system impact. In this way, as provided in some examples herein, a matched pair of EOMs that include matched DC bias structures may be used to dynamically correct the DC bias of a signal path EOM without perturbing that EOM's performance.

Because the matched pair of EOMs, which in some examples include matched RF signal structures and DC bias structures, are all on a common substrate and were formed using a single manufacturing processes, they may be expected to experience similar manufacturing process deviations and environmental conditions as one another. If the matched pair of DC bias structures are exposed to the same voltage for the preponderance of time, they may experience the same carrier drift and history conditions as one another. As provided herein, one of the DC bias structures is provided in a control path and is used to generate control information that may be applied to the signal path DC bias structure for use in dynamically correcting the DC bias of one of the EOMs. In comparison, in previously known circuits such as described above with reference to FIG. 1, the act of exercising the bias structure as appropriate to maintain DC bias (bias keeping) does itself deleteriously diminish SFDR. On the other hand, in such previously known circuits, bias keeping nonetheless may be required as the optimum bias will drift over time due to environmental and charging influences which also diminish SFDR. The present circuits and methods decouple these opposing challenges by introducing a second matched modulator expressly dedicated to bias determination via a separate control circuit. In addition to the matched pair of DC bias structures, or as an alternative to the matched pair of DC bias structures, a matched pair of carrier suppression structures may be provided on the common substrate. Because the structures all are on a common substrate and were formed using common manufacturing processes, they may be expected to experience similar carrier drift and environmental conditions as one another. As provided herein, one of the carrier suppression structures may be used to generate control information that may be applied to the other carrier suppression structures for use in suppressing the optical carrier frequency.

Some examples herein provide a circuit. The circuit may include a substrate that includes an input receiving an optical carrier having a frequency; and a waveguide splitting the input into a signal path having a signal path output and a control path having a control path output. The circuit also includes a first EOM. The first EOM includes a signal path RF structure including electrodes disposed along the signal path and configured to receive voltages to impose an RF signal on the optical carrier in the signal path; and a signal path DC bias structure including electrodes disposed along the signal path. The circuit also includes a second EOM. The second EOM includes a control path RF signal structure including electrodes disposed along the control path; and a control path DC bias structure including electrodes disposed along the control path. The circuit also includes a photodetector coupled to the control path output. The circuit also includes a controller including circuitry configured to determine a DC bias voltage for the control path using changes in optical intensity at the photodiode caused by applying voltages to the electrodes of the control path DC bias structure. The circuitry also is configured to correct DC bias in the signal path by applying the DC bias voltage, or a function thereof, to the electrodes of the signal path DC bias structure.

In some examples, the control path RF signal structure and the control path RF signal structure have approximately the same dimensions, materials, and manufacturing process as one another, and the signal path DC bias structure and the control path DC bias structure have approximately the same dimensions, materials, and manufacturing process as one another.

In some examples, the signal path and the control path have approximately the same phase velocity, local temperature, and charge accumulation characteristics as one another.

In some examples, the optical carrier is asymmetrically split between the signal path and the control path.

In some examples, the signal path DC bias structure is disposed between the signal path RF structure and the signal path output, and the control path DC bias structure is disposed between the control path RF signal structure and the control path output.

In some examples, the circuitry of the controller is configured to periodically determine an updated DC bias voltage for the control path using the control path DC bias structure, and to correct any drift in the DC bias in the signal path by applying the updated DC bias voltage, or a function thereof, to the signal path DC bias structure.

In some examples, the circuit further includes a signal path carrier suppression structure including electrodes along the signal path and a control path carrier suppression structure including electrodes along the control path. The circuitry of the controller further may be configured to determine a carrier suppression voltage for the control path using changes in optical intensity at the photodiode caused by applying voltages to the electrodes of the control path carrier suppression structure. The circuitry of the controller further may be configured to dynamically suppress the frequency of the optical carrier at the signal path output by applying the carrier suppression voltage, or a function thereof, to the electrodes of the signal path carrier suppression structure.

In some examples, the waveguide includes a junction splitting the signal path into first and second sections and a junction combining the first and second sections into the signal path output. A first one of the electrodes of the signal path RF signal structure may be between the first and second sections, a second one of the electrodes of the signal path RF signal structure may be outside the first section, and a third one of the electrodes of the signal path RF signal structure may be outside the second section. A first one of the electrodes of the signal path DC bias structure may be between the first and second sections, a second one of the electrodes of the signal path DC bias structure may be outside the first section, and a third one of the electrodes of the signal path DC bias structure may be outside the second section.

The waveguide further may include a junction splitting the control path into first and second sections and a junction combining the first and second sections into the signal path output. A first one of the electrodes of the control path RF signal structure may be between the first and second sections, a second one of the electrodes of the control path RF signal structure may be outside the first section, and a third one of the electrodes of the control path RF signal structure may be outside the second section. A first one of the electrodes of the control path DC bias structure may be between the first and second sections, a second one of the electrodes of the control path DC bias structure may be outside the first section, and a third one of the electrodes of the control path DC bias structure may be outside the second section.

Some examples herein provide a circuit. The circuit may include a substrate that includes an input receiving an optical carrier having a frequency; and a waveguide splitting the input into a signal path having a signal path output and a control path having a control path output. The circuit also may include a first EOM including a signal path RF signal structure including electrodes disposed along the signal path and configured to receive voltages to impose an RF signal on the optical carrier in the signal path. The circuit also may include a signal path carrier suppression structure including electrodes disposed along the signal path. The circuit also may include a second EOM including a control path RF signal structure including electrodes disposed along the control path. The circuit also may include a control path carrier suppression structure including electrodes disposed along the control path. The circuit also may include a photodetector coupled to the control path output. The circuit also may include a controller including circuitry configured to determine a carrier suppression voltage for the control path using changes in optical intensity at the photodiode caused by applying voltages to the electrodes of the control path carrier suppression structure. The circuitry also may be configured to suppress the frequency of the optical carrier at the signal path output by applying the carrier suppression voltage to the electrodes of the signal path carrier suppression structure.

In some examples, the signal path RF signal structure and the control path RF signal structure have approximately the same dimensions, materials, and manufacturing process as one another, and the signal path carrier suppression structure and the control path carrier suppression structure have approximately the same dimensions, materials, and manufacturing process as one another.

In some examples, the signal path and the control path have approximately the same phase velocity, local temperature, and charge accumulation characteristics as one another.

In some examples, the optical carrier is asymmetrically split between the signal path and the control path.

In some examples, the signal path carrier suppression structure is disposed between the signal path RF signal structure and the signal path output, and the control path carrier suppression structure is disposed between the control path RF signal structure and the control path output.

In some examples, the circuitry of the controller is configured to periodically determine an updated carrier suppression voltage using the control path carrier suppression structure, and to correct any changes to the optical carrier frequency at the signal path output by applying the updated carrier suppression voltage, or a function thereof, to the signal path carrier suppression structure.

In some examples, the circuit further includes a signal path DC bias structure including electrodes along the signal path and a control path DC bias structure including electrodes along the control path. The circuitry of the controller further may be configured to determine a DC bias voltage using changes in optical intensity at the photodiode caused by applying voltages to the electrodes of the control path DC bias structure. The circuitry further may be configured correct DC bias in the EOM by applying the DC bias voltage, or a function thereof, to the electrodes of the signal path DC bias structure.

In some examples, the waveguide further includes a junction splitting the signal path into first and second sections and a junction combining the first and second sections into the signal path output. A first one of the electrodes of the signal path RF signal structure may be between the first and second sections, a second one of the electrodes of the signal path RF signal structure may be outside the first section, and a third one of the electrodes of the signal path RF signal structure may be outside the second section. A first one of the electrodes of the signal path carrier suppression structure may be between the first and second sections, a second one of the electrodes of the signal path carrier suppression structure may be outside the first section, and a third one of the electrodes of the signal path carrier suppression structure may be outside the second section.

The waveguide further may include a junction splitting the control path into first and second sections and a junction combining the first and second sections into the signal path output. A first one of the electrodes of the control path RF signal structure may be between the first and second sections, a second one of the electrodes of the control path RF signal structure may be outside the first section, and a third one of the electrodes of the control path RF signal structure may be outside the second section. A first one of the electrodes of the control path carrier suppression structure may be between the first and second sections, a second one of the electrodes of the control path carrier suppression structure may be outside the first section, and a third one of the electrodes of the control path carrier suppression structure may be outside the second section.

Some examples herein provide a method. The method may include determining a DC bias voltage for a control path using a control path DC bias structure. The method may include correcting DC bias in a signal path by applying the DC bias voltage, or a function thereof, to a signal path DC bias structure. The method may include operating a signal path radio-frequency (RF) signal structure and a control path RF signal structure for a time period during which DC biases in the signal path and in the control path drift. The method may include determining an updated DC bias voltage for the control path using the control path DC bias structure. The method may include correcting the drift of the DC bias in the signal path by applying the updated DC bias voltage, or a function thereof, to the signal path DC bias structure.

In some examples, the signal path DC bias structure and the signal path RF signal structure are disposed along a signal path provided by a waveguide within a substrate, and the control path DC bias structure and the control path RF signal structure are disposed along a control path provided by the waveguide within the substrate.

Some examples herein provide another method. The method may include determining a carrier suppression voltage for a control path using a control path carrier suppression structure. The method may include suppressing a carrier frequency at a signal path output by applying the carrier suppression voltage, or a function thereof, to a signal path carrier suppression structure. The method may include operating a signal path radio-frequency (RF) signal structure for a time period during which the carrier frequency changes or carrier suppression voltages in the signal path or in the control path otherwise drift. The method may include determining an updated carrier suppression voltage for the control path using the control path carrier suppression structure. The method may include suppressing the carrier frequency at the signal path output by applying the updated carrier suppression voltage, or a function thereof, to the signal path carrier suppression structure.

In some examples, the signal path carrier suppression structure and the signal path RF signal structure are disposed along a signal path provided by a waveguide within a substrate, and the control path carrier suppression structure and the control path RF signal structure are disposed along a control path provided by the waveguide within the substrate.

Some examples herein provide still another method. The method may include determining a DC bias voltage for a control path using a control path DC bias structure. The method may include correcting DC bias in a signal path by applying the DC bias voltage, or a function thereof, to a signal path DC bias structure. The method may include determining a carrier suppression voltage for the control path using a control path carrier suppression structure. The method may include suppressing a carrier frequency at a signal path output by applying the carrier suppression voltage, or a function thereof, to a signal path carrier suppression structure. The method may include determining an updated DC bias voltage for the control path using the control path DC bias structure. The method may include correcting the DC bias in the signal path by applying the updated DC bias voltage, or a function thereof, to the signal path DC bias structure. The method may include determining an updated carrier suppression voltage for the control path using the control path carrier suppression structure. The method may include suppressing the carrier frequency at the signal path output by applying the updated carrier suppression voltage, or a function thereof, to the signal path carrier suppression structure.

DETAILED DESCRIPTION

Circuits and methods for correcting DC bias and suppressing optical carrier frequency in electro-optic modulators are provided herein.

As described in greater detail herein, the present circuits and methods provide for using a matched (approximately identical) pair of "integrated" electro-optic modulators (EOMs), one of which is along a signal path and dedicated to signal transduction, and the other of which is along a control path and dedicated to control of DC bias and/or optical carrier suppression.

Figure 1:
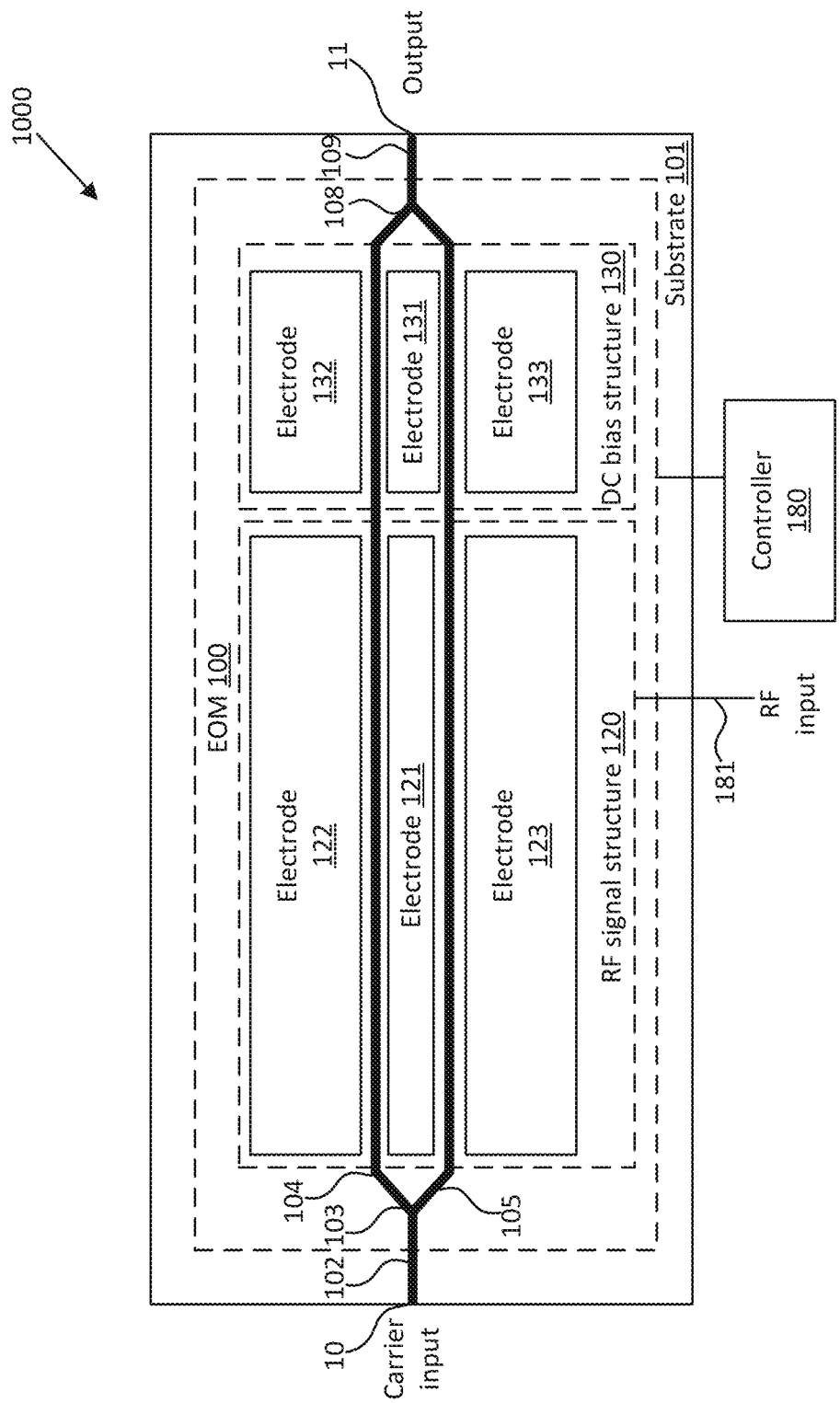
FIG. 1 schematically illustrates a plan view of a previously known circuit, an electro-optic modulator (EOM), which includes an RF signal structure and a DC bias structure.
Figure 2:
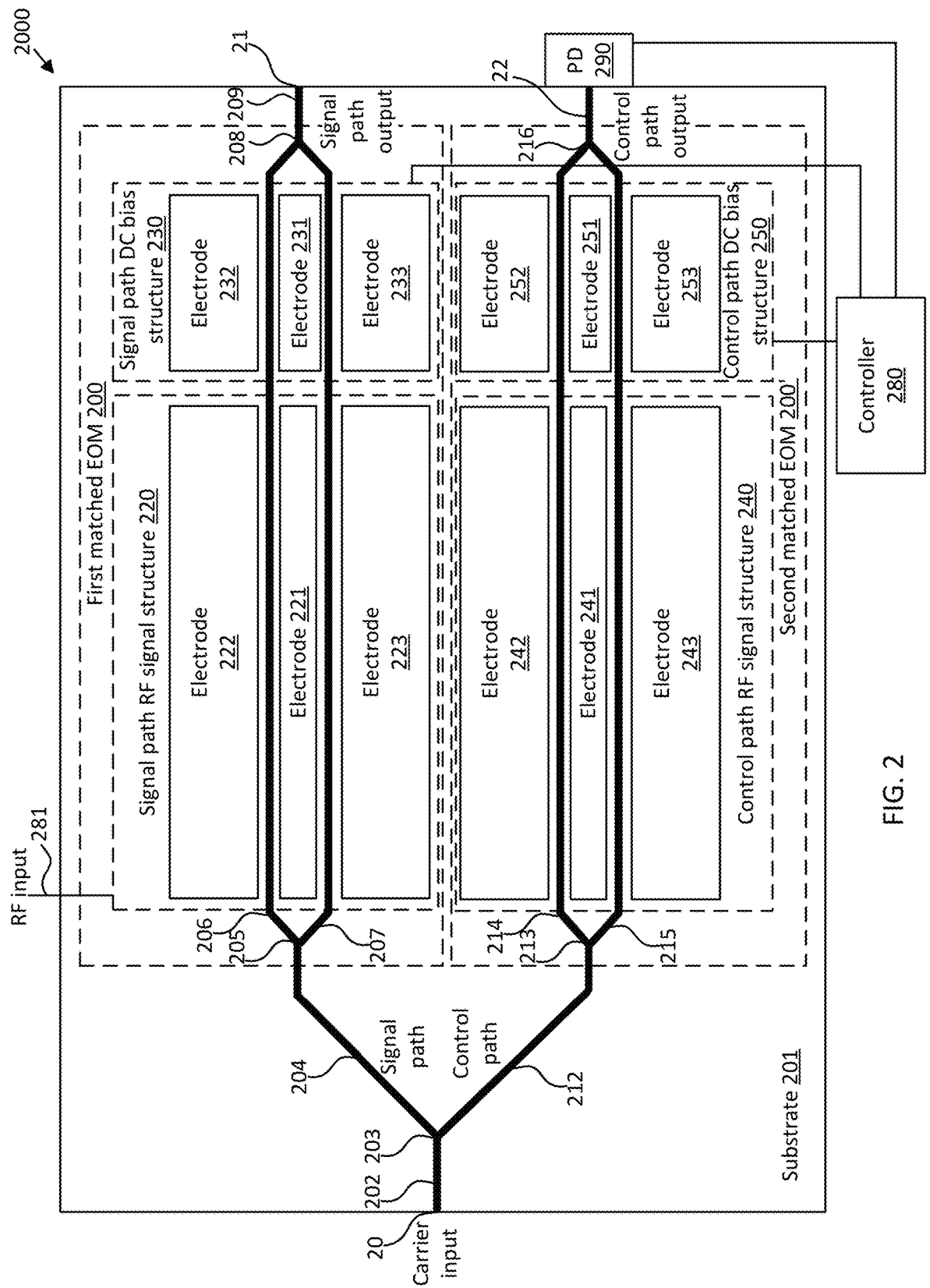
FIG. 2 schematically illustrates a plan view of a circuit including matched EOMs each including an RF signal structure and DC bias structure, according to some examples provided herein.

For example, FIG. 2 schematically illustrates a plan view of a circuit 2000 including matched EOMs 200, 200' each including an RF signal structure and DC bias structure according to some examples provided herein. Circuit 2000 illustrated in FIG. 2 may include substrate 201 having a carrier input 20 receiving an optical carrier having a frequency, and a waveguide splitting the input into a signal path having a signal path output 21 and a control path having a control path output 22. Circuit 2000 further may include first matched EOM 200 disposed along the signal path and including signal path RF signal structure 220 (including electrodes 221, 222, 223) and signal path DC bias structure 230 (including electrodes 231, 232, 233); and second matched EOM 200' disposed along the control path and including control path RF signal structure 240 (including electrodes 241, 242, 243) and control path DC bias structure 250 (including electrodes 251, 252, 253). The waveguide may be formed within substrate 201, and the electrodes of signal path RF signal structure 220, signal path DC bias structure 230, control path RF signal structure 240, and control path DC bias structure 250 may be suitably disposed on substrate 201 relative to the waveguide, in a manner such as described with reference to FIG. 1 or otherwise known in the art.

A radio-frequency (RF) signal, received by RF input 281, may be imposed on the optical carrier in the signal path by applying voltages to the electrodes of signal path RF signal structure 220, resulting in changes in optical intensity at signal path output 21. Circuit 2000 further may include controller 280. Although specific details of the connections are omitted from FIG. 2 for simplicity, controller 280 may be coupled to each of the respective electrodes of signal path DC bias structure 230 and control path DC bias structure 250 and configured to apply voltages thereto using instructions stored at controller 280. In a manner such as described in greater detail herein, controller 280 may be configured to use control path DC bias structure 250 to determine DC bias voltage(s) to apply to signal path DC bias structure 230 so as to correct any DC bias in the signal path, even if such DC bias drifts over time in a manner such as described with reference to FIG. 1. The optical carrier may be asymmetrically split between the signal path and the control path, e.g., may be split so as to have a relatively higher intensity on the signal path and thus enhance the signal-to-noise ratio of the signal at output 21, and a relatively lower intensity on the control path that is sufficient to determine the DC bias(es) to be applied to signal path DC bias structure 230 and control path DC bias structure 250.

In the nonlimiting example illustrated in FIG. 2, the waveguide may include a section 202 receiving optical carrier from carrier input 20 and a junction 203 splitting the optical carrier onto the signal path and the control path. The waveguide further may include junction 205 splitting the signal path into first and second sections 206, 207, and junction 208 combining the first and second sections into a section 209 leading to signal path output 21. In a manner similar to that described with reference to FIG. 1, differences in the optical path length between the first and second sections of the signal path cause interference between the portions of the carrier within those sections, thus resulting in changes in intensity at output 21. A first one of the electrodes (e.g., electrode 221) of signal path RF signal structure 220 may be between the first and second sections 206, 207, a second one of the electrodes (e.g., electrode 222) of signal path RF signal structure 220 may be outside the first section 206, and a third one of the electrodes (e.g., electrode 223) of signal path RF signal structure 220 may be outside the second section. A first one of the electrodes (e.g., electrode 231) of signal path DC bias structure 230 may be between the first and second sections 206, 207, a second one of the electrodes (e.g., electrode 232) of DC bias structure 230 may be outside the first section 206, and a third one of the electrodes (e.g., electrode 233) of DC bias structure 230 may be outside the second section 207. In a manner such as illustrated in FIG. 2, signal path DC bias structure 230 may be disposed between signal path RF signal structure 220 and the signal path output 21.

The waveguide further may include a junction 213 splitting the control path into first and second sections 214, 215, and a junction 216 combining the first and second sections into the control path output 22. A first one of the electrodes (e.g., electrode 241) of control path RF signal structure 240 may be between the first and second sections 214, 215, a second one of the electrodes (e.g., electrode 242) of control path RF signal structure 240 may be outside the first section 214, and a third one of the electrodes (e.g., electrode 243) of control path RF signal structure 240 may be outside the second section 215. A first one of the electrodes (e.g., electrode 251) of the control path DC bias structure 250 may be between the first and second sections 214, 215, a second one of the electrodes (e.g., electrode 252) of the control path DC bias structure 250 may be outside the first section 214, and a third one of the electrodes (e.g., electrode 253) of the control path DC bias structure 250 may be outside the second section 215. In a manner such as illustrated in FIG. 2, control path DC bias structure 250 may be disposed between control path RF signal structure 240 and control path output 22.

Control path RF signal structure 240 may have electrical, optical and physical characteristics that are approximately identical to those of signal path RF signal structure 220. For example, control path RF signal structure 240 and signal path RF signal structure 220 may have approximately the same dimensions, materials, and manufacturing process as one another. Illustratively, electrodes 221 and 241 may have approximately the same dimensions as one another, electrodes 222 and 242 may have approximately the same dimensions as one another, and electrodes 223 and 243 may have approximately the same dimensions as one another. Similarly, control path DC bias structure 250 may have electrical, optical, and physical characteristics that are approximately identical to that of signal path DC bias structure 230. For example, control path DC bias structure 250 and signal path DC bias structure 230 may have approximately the same dimensions, materials, and manufacturing process as one another. Illustratively, electrodes 231 and 251 may have approximately the same dimensions as one another, electrodes 232 and 252 may have approximately the same dimensions as one another, and electrodes 233 and 253 may have approximately the same dimensions as one another. Electrodes 221, 222, 223, 231, 232, 233, 241, 242, 243, 251, 252, and 253 may be formed in the same set of manufacturing processes, with the same materials, as one another. As such, any static differences arising from the stochastic nature of processing may be expected to experienced approximately equally by both paths and/or may be readily addressed by applying a DC bias voltage in a manner such as provided herein. As used herein, the terms "about" and "approximately" are intended to mean within 20% of the stated value. For example, dimensions that are "approximately the same" as one another means that the dimensions are within 20% of one another, or within 10% of one another.

The signal path and the control path of circuit 2000 may be expected to have approximately the same phase velocity, local temperature, and charge accumulation characteristics as one another. For example, at any given time while circuit 2000 is in service (e.g., while voltages are being applied to the electrodes of signal path RF signal structure 220 to impose the RF signal on the carrier), control path RF signal structure 240 and control path DC bias structure 250 respectively may be expected to experience similar charge accumulation, self-heating, and external heating as signal path RF signal structure 220 and signal path DC bias structure 230, because the components are all disposed on the same substrate 201, for the same amount of time, and under approximately the same electrical and external conditions as one another. As provided herein, control path DC bias structure 250 may be used to calibrate any DC bias within the control path through second matched EOM 200' while circuit 2000 is in service and without interfering with operation of first matched EOM 200, and such calibration of the control path then may be applied to signal path DC bias structure 230 so as to offset any DC bias within the signal path that may have occurred while first matched EOM 200 is in service. Such calibration of DC bias within second matched EOM 200', and application of such calibration to offset any DC bias within first matched EOM 200, may be performed repeatedly while circuit 2000 is in service and thus may be experiencing drift caused by changes in charge accumulation, self-heating, and/or external heating.

For example, in the example configuration illustrated in FIG. 2, circuit 2000 includes photodetector (PD) 290 coupled to control path output 22. The photodetector 290 may be integrated into substrate 201, or may be separately formed and suitably coupled to the substrate. Controller 280 may be configured determine a DC bias voltage for the control path using changes in optical intensity at photodiode 290 caused by applying voltages to the electrodes of the control path DC bias structure, and to correct DC bias in the signal path by applying the DC bias voltage, or a function thereof, to the electrodes of signal path DC bias structure 230. More specifically, controller 280 may be configured to sweep the voltages between electrodes 251, 252, and/or 253 between zero and a voltage that shifts the optical path length within first section 214 by at least one wavelength (and optionally, multiple wavelengths) of the optical carrier relative to the optical path length within second section 215, and thus to sinusoidally sweep the interference intensity at output 22 between one or more minima (corresponding to total destructive interference between the carrier portions in first section 214 and second section 215) and one or more maxima (corresponding to total constructive interference between the carrier portions in first section 214 and second section 215). Controller 280 may be configured to determine, using the changes in intensity recorded by photodiode 290, a voltage of control path DC bias structure 250 that corresponds to a quadrature point of control path RF signal structure 240, which is the mid-way point along the sinusoid where the response curve is approximately linear such that a change in bias voltage would generate a proportional change in output intensity of control path RF signal structure 240 if voltages were applied to the control path RF signal structure.

Controller 280 then may apply that voltage, or a function thereof, to signal path DC bias structure 230 so as to adjust the DC bias of the signal path to place first matched EOM 200 at its quadrature point. That is, controller 280's calibration of the control path using control path DC bias structure 250, on second matched EOM 200' on the control path, may be applied to EOM 200 using signal path DC bias structure 230. Additionally, controller 280 may apply the same voltage to control path DC bias structure 250, so that the control path and signal path both continue to experience approximately the same set of conditions. In some examples, controller 280 applies the determined DC bias voltage for control path DC bias structure 250 directly, without modification, to both signal path DC bias structure 230 and control path DC bias structure 250. In other examples, controller 280 applies a function of the determined DC bias voltage for control path DC bias structure 250 to signal path DC bias structure 230, while applying the unmodified voltage to control path DC bias structure 250. Illustratively, at the time of manufacture, a separate calibration step may be used to determine any function (e.g., slope correction and/or offset correction) that relates the response to voltage of signal path DC bias structure 230 to that of control path DC bias structure 250, and controller 280 may be configured to apply such function to the voltage of control path DC bias structure 250 and apply the output of such function to signal path DC bias structure 230.

Additionally, in a manner such as described in greater detail with reference to FIGS. 3, 7, and 8, the circuitry of controller 280 may be configured to periodically determine an updated DC bias voltage for the control path using the control path DC bias structure, and to correct any drift of the DC bias in the first matched EOM 200 by applying the updated DC bias voltage, or a function thereof, to the signal path DC bias structure. As another or additional option, in a manner such as described with reference to FIGS. 6A-6B, 7, and 8, circuit 2000 further may include a signal path carrier suppression structure including electrodes along the signal path and a control path carrier suppression structure including electrodes along the control path, and controller 280 may be configured to determine a carrier suppression voltage for the control path using changes in optical intensity at photodiode 290 caused by applying voltages to the electrodes of the control path carrier suppression structure, and to dynamically suppress the frequency of the optical carrier at the signal path output 21 by applying the carrier suppression voltage, or a function thereof, to the electrodes of the signal path carrier suppression structure.

Figure 3:
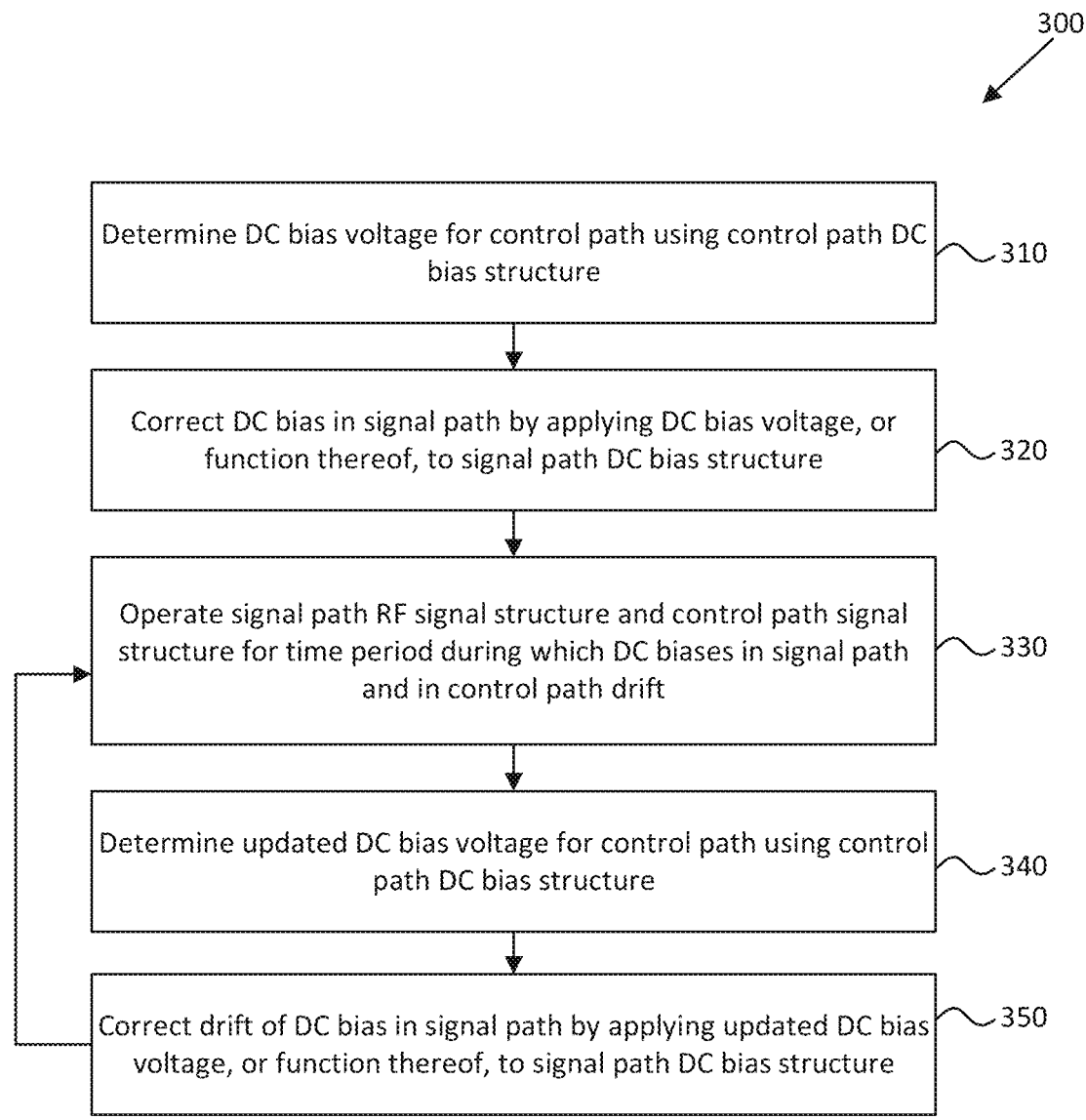
FIG. 3 illustrates a flow of operations in a method for correcting DC bias in an EOM, according to some examples provided herein.

FIG. 3 illustrates a flow of operations in a method for correcting DC bias in an EOM, according to some examples provided herein. Method 300 illustrated in FIG. 3 includes determining a DC bias voltage for a control path using a control path DC bias structure (operation 310). For example, controller 280 may determine a DC bias voltage for the control path using control path DC bias structure 250 in a manner such as described with reference to FIG. 2. Method 300 illustrated in FIG. 3 also may include correcting DC bias in a signal path by applying the DC bias voltage, or a function thereof, to a signal path DC bias structure (operation 320). For example, controller 280 may apply the DC bias voltage that was determined for the control path using control path DC bias structure 250, to signal path DC bias structure 230 so as to offset DC bias for the signal path. Method 300 illustrated in FIG. 3 also may include operating a signal path RF signal structure and a control path RF signal structure for a time period during which DC biases in the signal path and in the control path drift (operation 330). For example, while circuit 2000 is in service, changes in charge accumulation, self-heating, and/or external heating may cause the DC bias voltage of the signal path and of the control path to drift in a manner similar to that described with reference to FIG. 1. Method 300 illustrated in FIG. 3 may include determining an updated DC bias voltage for the control path using the control path DC bias structure (operation 340). For example, controller 280 may be configured, while circuit 2000 remains in service and after a predetermined period of time of such service, to recalibrate the DC bias voltage for the control path using control path DC bias structure 250 using changes in intensity at photodetector 290 caused by applying different voltages to the electrodes of control path DC bias structure 250. Method 300 illustrated in FIG. 3 also may include correcting the drift in the DC bias in the signal path by applying the updated DC bias voltage, or a function thereof, to the signal path DC bias structure (operation 350). Illustratively, controller 280 may apply the DC bias voltage directly to signal path DC bias structure 230, or may apply a function of such voltage in a manner such as described with reference to FIG. 2. Operations 330, 340, and 350 may be repeated any suitable number of times and with any suitable frequency while the circuit is in operation, so as to periodically update the DC bias voltage for the signal path.

Accordingly, from examples such as described with reference to FIGS. 2 and 3, it may be understood that an input optical carrier may be split asymmetrically to favor the signal path in order to reduce or minimize optical-loss induced degradation to the SNR. The control path may be provided an appropriate optical power to run the control routines such as described with reference to FIG. 3. No calibrations need be performed on the signal path during normal operation, and as such, the signal path may remain available for signal transduction. The voltage applied to the DC bias of the control path may be ramped relatively rapidly to obtain the calibration data and determine a suitable DC bias voltage. The magnitude of the calibration voltage ramp may be relatively large and may not impact the signal path. Calibration data may be selected based on modulator operation mode. Calibration methods for the control path may include, among other options, optical power monitoring or intermodulation distortion monitoring similar to that described in Fu et al., "Mach-Zehnder: A review of bias control techniques for Mach-Zehnder modulators in photonic analog links," IEEE Microwave Magazine 14(7): 102-107 (2013), the entire contents of which are incorporated by reference herein. The DC bias voltage may be immediately set for both the signal path and the control path. The signal path and control path may experience the same deleterious charging effects induced by the DC bias voltage application, because the applied DC bias voltage on the control path and the signal path may be the same, or approximately the same, for the gross majority of time, while control path calibration periodically is performed relatively rapidly and for a relatively small amount of time relative to the operation of the circuit.

It will therefore be appreciated that circuits and methods such as described with reference to FIGS. 2 and 3 may recalibrate the DC bias voltage for the signal path with any desired frequency, without taking first matched EOM 200 out of service for such calibration and thus without impacting the ability of signal path RF signal structure 220 to continuously impose the RF signal onto the optical carrier. Additionally, no deleterious effects from such calibration may manifest in the signal path, e.g., as unwanted reductions in spur-free dynamic-range (SFDR) or in SNR. Additionally, circuits and methods such as described with reference to FIGS. 2 and 3 may maintain quadrature bias (the DC bias voltage maintaining EOM 200 at the quadrature point) in view of any phenomena that are equally experienced by the signal and control paths, including charging effects, pyroelectric effects, temperature drift, or environmental phenomena. As such, the signal path's DC bias voltage may be controlled precisely, e.g., so as to achieve maximal SFDR and SNR without perturbing the signal path with calibration. Additionally, because the control path and the signal path, and the elements thereon, are co-located, co-processed, and co-manufactured, calibration data obtained for the control path also is descriptive of, and may be applied to, the signal path. Additionally, because the control path and signal path share approximately the same operating history, both paths may be expected to exhibit the same characteristics and calibration data for static phenomena and phenomena that have memory, such as charge displacement.

As noted further above, circuits and methods provided herein also, or alternatively, may be used to suppress the frequency of an optical carrier. For example, FIG. 4 schematically illustrates a plan view of a circuit 4000 including matched EOMs 400, 400' and matched signal path carrier suppression structures, according to some examples provided herein.

Figure 4:
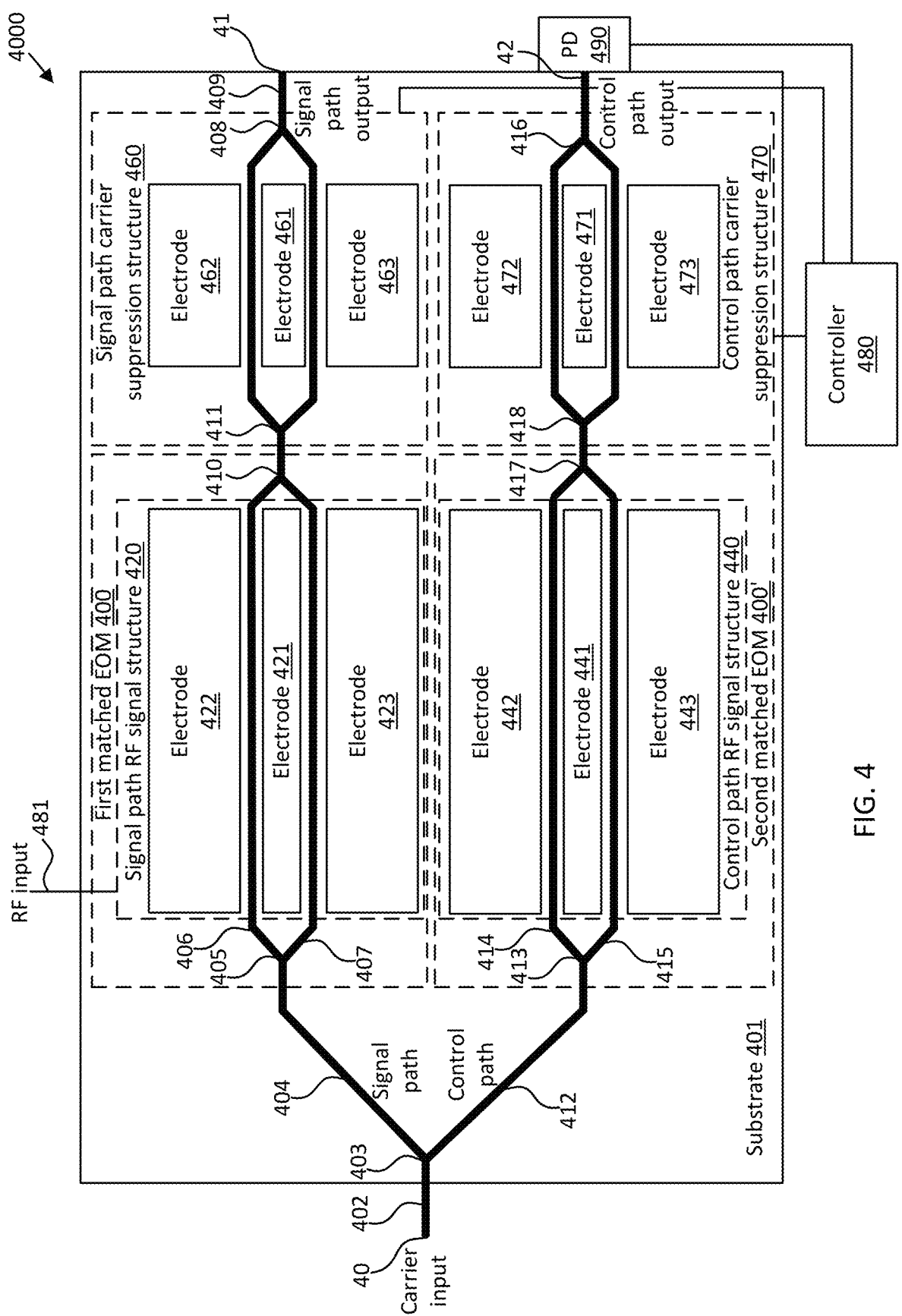
FIG. 4 schematically illustrates a plan view of a circuit including matched EOMs and matched signal path carrier suppression structures, according to some examples provided herein.

Circuit 4000 illustrated in FIG. 4 may include substrate 401 having an input 40 receiving an optical carrier having a frequency, and a waveguide splitting the input into a signal path having a signal path output 41 and a control path having a control path output 42. Circuit 4000 further may include first matched EOM 400 disposed along the signal path and including signal path RF structure 420 (including electrodes 421, 422, 423) and signal path carrier suppression structure 460 (including electrodes 461, 462, 463); and second matched EOM 400' disposed along the control path and including control path RF signal structure 440 (including electrodes 441, 442, 443) and control path carrier suppression structure 470 (including electrodes 471, 472, 473). The waveguide may be formed within substrate 401, and the electrodes of signal path RF structure 420, signal path carrier suppression structure 460, control path RF signal structure 440, and control path carrier suppression structure 470 may be suitably disposed on substrate 401 relative to the waveguide, in a manner such as described with reference to FIG. 1 or otherwise known in the art.

An RF signal, received by RF input 481, may be imposed on the optical carrier in the signal path by applying voltages to the electrodes of signal path RF signal structure 420, resulting in changes in optical intensity at signal path output 41. Although specific details of the connections are omitted from FIG. 4 for simplicity, controller 480 may be coupled to each of the respective electrodes of signal path carrier suppression structure 460 and control path carrier suppression structure 470 and configured to apply voltages thereto using instructions stored at controller 480. In a manner such as described in greater detail herein, controller 480 may be configured to use control path carrier suppression structure 470 to determine carrier suppression voltage(s) to apply to signal path carrier suppression structure 460 so as to suppress the optical carrier frequency, even if such frequency changes over time in a manner such as described with reference to FIG. 1. The optical carrier may be asymmetrically split between the signal path and the control path, e.g., may be split so as to have a relatively higher intensity on the signal path and thus enhance the signal-to-noise ratio of the signal at signal path output 41, and a relatively lower intensity on the control path that is sufficient to determine the carrier suppression voltage(s) to be applied to signal path carrier suppression structure 460 and control path carrier suppression structure 470.

In the nonlimiting example illustrated in FIG. 4, the waveguide may include a section 402 receiving optical carrier from carrier input 40 and a junction 403 splitting the optical carrier onto the signal path and the control path. The waveguide further may include junction 405 splitting the signal path into first and second sections 406, 407, junction 410 interferometrically combining the first and second sections into a section leading to another junction 411 splitting the signal path into third and fourth junctions, and junction 408 interferometrically combining the third and fourth sections into section 409 leading to signal path output 41. In a manner similar to that described with reference to FIG. 1, differences in the optical path length between the first and second sections of the signal path caused by applying voltages to the electrodes of signal path RF signal structure 420 cause interference between the portions of the carrier within those sections, thus resulting in changes in intensity at output 41. A first one of the electrodes (e.g., electrode 421) of signal path RF signal structure 420 may be between the first and second sections 406, 407, a second one of the electrodes (e.g., electrode 422) of signal path RF signal structure 420 may be outside the first section 406, and a third one of the electrodes (e.g., electrode 423) of signal path RF signal structure 420 may be outside the second section. A first one of the electrodes (e.g., electrode 461) of signal path carrier suppression structure 460 may be between the third and fourth sections, a second one of the electrodes (e.g., electrode 462) of signal path carrier suppression structure 460 may be outside the third section, and a third one of the electrodes (e.g., electrode 463) of signal path carrier suppression structure 460 outside the fourth section. In a manner such as illustrated in FIG. 4, signal path carrier suppression structure 460 may be disposed between signal path RF signal structure 420 and the signal path output 41.

The waveguide further may include a junction 413 splitting the control path into first and second sections 414, 415, junction 417 combining the first and second sections into a section leading to another junction 418 splitting the control path into third and fourth junctions, and a junction 416 interferometrically combining the third and fourth sections into the control path output 42. A first one of the electrodes (e.g., electrode 441) of control path RF signal structure 440 may be between the first and second sections 414, 415, a second one of the electrodes (e.g., electrode 442) of control path RF signal structure 440 may be outside the first section 414, and a third one of the electrodes (e.g., electrode 443) of control path RF signal structure 440 may be outside the second section 415. A first one of the electrodes (e.g., electrode 471) of the control path carrier suppression structure 470 may be between the third and fourth sections, a second one of the electrodes (e.g., electrode 472) of the control path carrier suppression structure 470 may be outside the third section, and a third one of the electrodes (e.g., electrode 473) of the control path carrier suppression structure 470 may be outside the fourth section. In a manner such as illustrated in FIG. 4, control path carrier suppression structure 470 may be disposed between control path RF signal structure 440 and control path output 42.

In a manner similar to that described with reference to FIG. 2, control path RF signal structure 440 may have electrical, optical and physical characteristics that are approximately identical to those of signal path RF signal structure 420. For example, control path RF signal structure 440 and signal path RF signal structure 420 may have approximately the same dimensions, materials, and manufacturing process as one another. Illustratively, electrodes 421 and 441 may have approximately the same dimensions as one another, electrodes 422 and 442 may have approximately the same dimensions as one another, and electrodes 423 and 443 may have approximately the same dimensions as one another. Similarly, control path carrier suppression structure 470 may have electrical, optical, and physical characteristics that are approximately identical to that of signal path carrier suppression structure 460. For example, control path carrier suppression structure 470 and signal path carrier suppression structure 460 may have approximately the same dimensions, materials, and manufacturing process as one another. Illustratively, electrodes 461 and 471 may have approximately the same dimensions as one another, electrodes 462 and 472 may have approximately the same dimensions as one another, and electrodes 463 and 473 may have approximately the same dimensions as one another. Electrodes 421, 422, 423, 461, 462, 463, 441, 442, 443, 471, 472, and 473 may be formed in the same set of manufacturing processes, with the same materials, as one another. As such, any static differences arising from the stochastic nature of processing may be expected to experienced approximately equally by both paths and/or may be readily addressed by applying a DC bias voltage in a manner such as provided herein.

In a manner similar to that described with reference to FIG. 2, the signal path and the control path of circuit 4000 also may be expected to have approximately the same phase velocity, local temperature, and charge accumulation characteristics as one another, and also see the same carrier frequency as one another. For example, at any given time while circuit 4000 is in service (e.g., while voltages are applied to the electrodes of signal path RF signal structure 420 to impose the RF signal on the carrier), control path RF signal structure 440 and control path carrier suppression structure 470 respectively may be expected to experience similar charge accumulation, self-heating, and external heating as signal path RF signal structure 420 and signal path carrier suppression structure 420, and also may observe the same carrier frequency, because the components are all disposed on the same substrate 401, for the same amount of time, and under approximately the same electrical and external conditions as one another. As provided herein, control path carrier suppression structure 470 may be used to determine an appropriate voltage to interferometrically suppress the optical carrier frequency at control path output 42 while circuit 4000 is in service and without interfering with operation of signal path RF signal structure 420 and signal path carrier suppression structure 460, and that such calibrated voltage then may be applied to signal path carrier suppression structure 460 so as to interferometrically suppress the optical carrier frequency at signal path output 41 while circuit 420 is in service. Such calibration of interferometric carrier suppression along the control path, and application of such calibration to the signal path, may be performed repeatedly while circuit 4000 is in service and without detrimentally affecting the RF signal imposed on the optical carrier.

For example, in the example configuration illustrated in FIG. 4, circuit 4000 includes photodetector (PD) 490 coupled to control path output 42. The photodetector 490 may be integrated into substrate 401, or may be separately formed and suitably coupled to the substrate. Controller 480 may be configured to determine a carrier suppression voltage for the control path using changes in optical intensity at the photodiode 490 caused by applying voltages to the electrodes of the control path carrier suppression structure 470, and to suppress the frequency of the optical carrier at signal path output 41 by applying the carrier suppression voltage to the electrodes of signal path carrier suppression structure 460. More specifically, controller 480 may be configured to sweep the voltages between electrodes 471, 472, and/or 473 between zero and a voltage that shifts the optical path length within first section 414 by at least one wavelength (and optionally, multiple wavelengths) of the optical carrier relative to the optical path length within second section 415, and thus to sinusoidally sweep the interference intensity at output 42 between one or more minima (corresponding to total destructive interference between the carrier portions in first section 414 and second section 415) and one or more maxima (corresponding to total constructive interference between the carrier portions in first section 414 and second section 415). Controller 480 may be configured to determine, using the changes in intensity recorded by photodiode 490, a voltage of control path carrier suppression structure 470 that causes interferometric suppression of the optical carrier frequency at control path output 42.

Controller 480 then may apply that voltage, or a function thereof, to signal path carrier suppression structure 460 so as to interferometrically suppress the optical carrier frequency at signal path output 41. That is, controller 480's calibration to suppress the optical carrier frequency on the control path, using control path carrier suppression structure 470, may be applied to the signal path using signal path carrier suppression structure 460. Additionally, controller 480 may apply the same voltage to control path carrier suppression structure 470, so that the control path and signal path both continue to experience approximately the same set of conditions. In some examples, controller 480 applies the determined carrier suppression voltage for control path carrier suppression structure 470 directly, without modification, to both signal path carrier suppression structure 460 and control path carrier suppression structure 470. In other examples, controller 480 applies a function of the determined carrier suppression voltage for control path carrier suppression structure 470 to signal path carrier suppression structure 460, while applying the unmodified voltage to control path carrier suppression structure 470. Illustratively, at the time of manufacture, a separate calibration step may be used to determine any function (e.g., slope correction and/or offset correction) that relates the response to voltage of signal path carrier suppression structure 460 to that of control path carrier suppression structure 470, and controller 480 may be configured to apply such function to the voltage of control path carrier suppression structure 470 and apply the output of such function to signal path carrier suppression structure 460. Additionally, in a manner such as described in greater detail with reference to FIGS. 5, 7, and 8, the circuitry of controller 480 may be configured to periodically determine an updated carrier suppression voltage using the control path carrier suppression structure, and to correct any changes to the optical carrier frequency at the signal path output by applying the updated carrier suppression voltage, or a function thereof, to the signal path carrier suppression structure.

Figure 5:
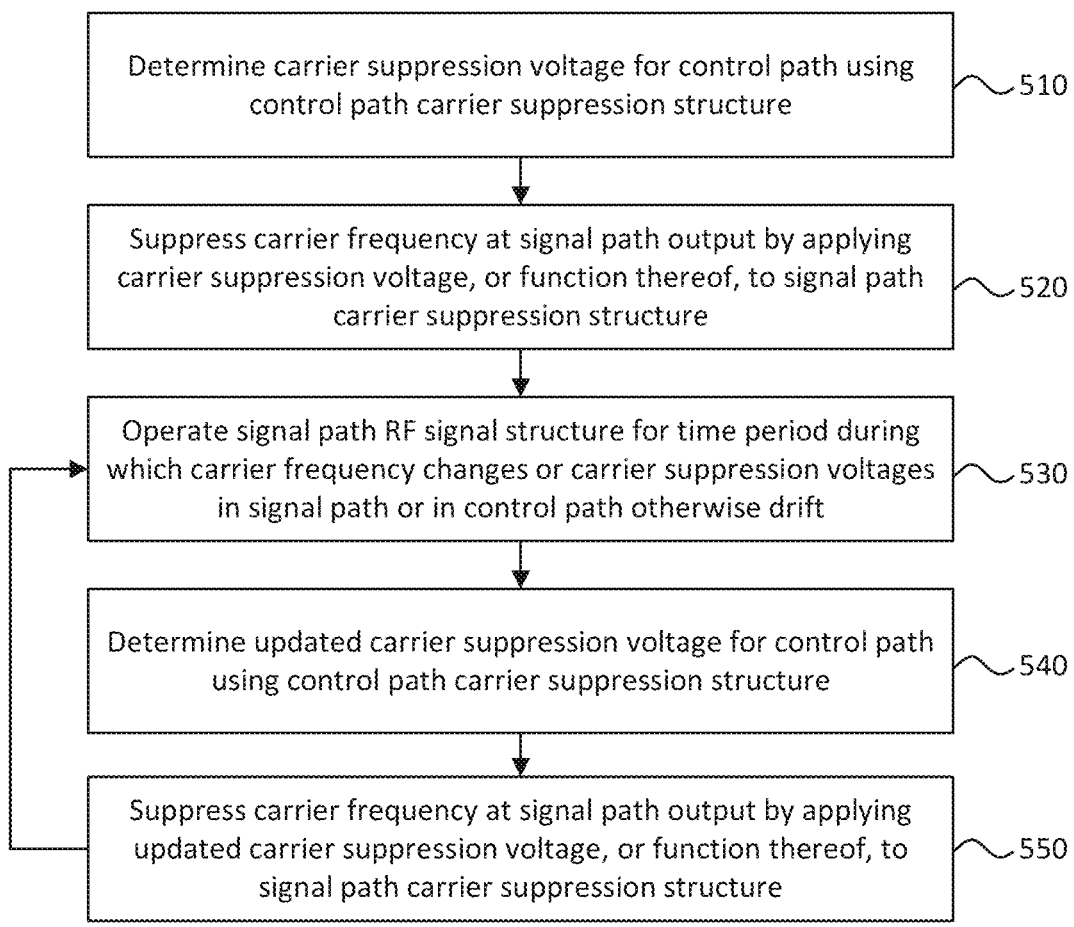
FIG. 5 illustrates a flow of operations in a method for suppressing an optical carrier frequency in an EOM, according to some examples provided herein.

FIG. 5 illustrates a flow of operations in a method for suppressing an optical carrier frequency in an EOM, according to some examples provided herein. Method 500 illustrated in FIG. 5 may include determining a carrier suppression voltage for a control path using a control path carrier suppression structure (operation 510). For example, controller 480 may use control path carrier suppression structure 470 to determine a carrier suppression voltage for the control path. Method 500 also may include suppressing a carrier frequency at a signal path output by applying the carrier suppression voltage, or a function thereof, to a signal path carrier suppression structure (operation 520). For example, controller 480 may apply the carrier suppression voltage to signal path carrier suppression structure 460 directly, or may apply a function of the carrier suppression voltage to signal path carrier suppression structure 460. Method 500 also my include operating a signal path RF signal structure for a time period during which the carrier frequency changes or carrier suppression voltages in the signal path or in the control path otherwise drift (operation 530). For example, a source of the optical carrier (such as a laser) may experience an internal change or environmental change that causes the carrier frequency to drift, or the carrier frequency may be intentionally changed, and/or drift in the signal path or control path may otherwise alter the optimal carrier suppression voltage. Method 500 may include determining an updated carrier suppression voltage for the control path using the control path carrier suppression structure (operation 540). For example, controller 480 may use control path carrier suppression structure 470 to determine a carrier suppression voltage for the control path 440. Method 500 may include suppressing the carrier frequency at the signal path output by applying the updated carrier suppression voltage, or a function thereof, to the signal path carrier suppression structure (operation 550). For example, controller 480 may apply the updated carrier suppression voltage to signal path carrier suppression structure 460 directly, or may apply a function of the updated carrier suppression voltage to signal path carrier suppression structure 460. Operations 530, 540, and 550 may be repeated any suitable number of times and with any suitable frequency while the circuit is in operation, so as to periodically update the carrier suppression voltage for the signal path.

Accordingly, from examples such as described with reference to FIGS. 4 and 5, it may be understood that carrier suppression may be performed by a suitable signal path carrier suppression structure, which may include or may consist essentially of a tunable Mach-Zehnder interferometer (MZI) such as illustrated in FIG. 4, or other suitable interferometric component such as a tunable ring filter or photonic crystal cavity. By tuning the signal path carrier suppression structure to interferometrically suppress the optical carrier frequency, which carries no information but otherwise would provide the majority of the light at signal path output 41, the SNR at the signal path output may be dramatically improved. For example, alternative carrier suppression approaches utilizing tunable optical filters may be challenged by the drifting wavelength of the optical carrier source and the drifting wavelength of the optical filter. Filter drift may be caused by a number of phenomena such as charging effects, pyroelectric effects, temperature drift, and environmental phenomena. In comparison, circuits and methods such as described with reference to FIGS. 4 and 5 may mitigate any such drifting effects by using the control path to determine, as often as desired, an appropriate carrier suppression voltage to apply to the signal path. Note that the electrodes of the control path RF signal structure on the control path may not necessarily be excited or even contacted by the controller, and as such may be grounded or may float. As such, the control path carrier suppression structure, on the control path, may be optimized so as to suppress the optical carrier frequency prior to modulation. As such, no intermixing of the modulation dynamics and the carrier suppression voltage analysis is expected to occur.

The control path may be provided an appropriate optical power to run the control routines such as described with reference to FIG. 5. No calibrations need be performed on the signal path during normal operation, and as such, the signal path may remain available for signal transduction. The voltage applied to the control path carrier suppression structure of the control path may be ramped relatively rapidly to obtain the calibration data and determine a suitable carrier suppression voltage. The magnitude of the calibration voltage ramp may be relatively large and may not impact the signal path. Calibration data may be selected based on modulator operation mode. The carrier suppression voltage may be immediately set for both the signal path and the control path. The signal path and control path may experience the same deleterious charging effects induced by the DC bias voltage application, because the applied DC bias voltage on the control path and the signal path may be the same, or approximately the same, for the gross majority of time, while control path calibration periodically is performed relatively rapidly and for a relatively small amount of time relative to the operation of the circuit.

It will therefore be appreciated that circuits and methods such as described with reference to FIGS. 4 and 5 may recalibrate the carrier suppression voltage for the signal path as frequently as desired, without taking first matched EOM 4000 out of service for such calibration and thus without impacting the ability of signal path RF signal structure 420 to continuously impose the RF signal onto the optical carrier. Additionally, no deleterious effects from such calibration may manifest in the signal path, e.g., as unwanted reductions in spur-free dynamic-range (SFDR) or in SNR. Additionally, circuits and methods such as described with reference to FIGS. 4 and 5 may maintain the carrier suppression voltage in view of any phenomena that are equally experienced by the signal and control paths, including charging effects, pyroelectric effects, temperature drift, or environmental phenomena. As such, the signal path's carrier suppression voltage may be controlled precisely, e.g., so as to achieve maximal SFDR and SNR without perturbing the signal path with calibration. Additionally, because the control path and the signal path, and the elements thereon, are co-located, co-processed, and co-manufactured, and transmit the same carrier frequency, calibration data obtained for the control path also is descriptive of, and may be applied to, the signal path. Additionally, because the control path and signal path share approximately the same operating history, both paths may be expected to exhibit the same characteristics and calibration data for static phenomena and phenomena that have memory, such as charge displacement.

Figure 6A:
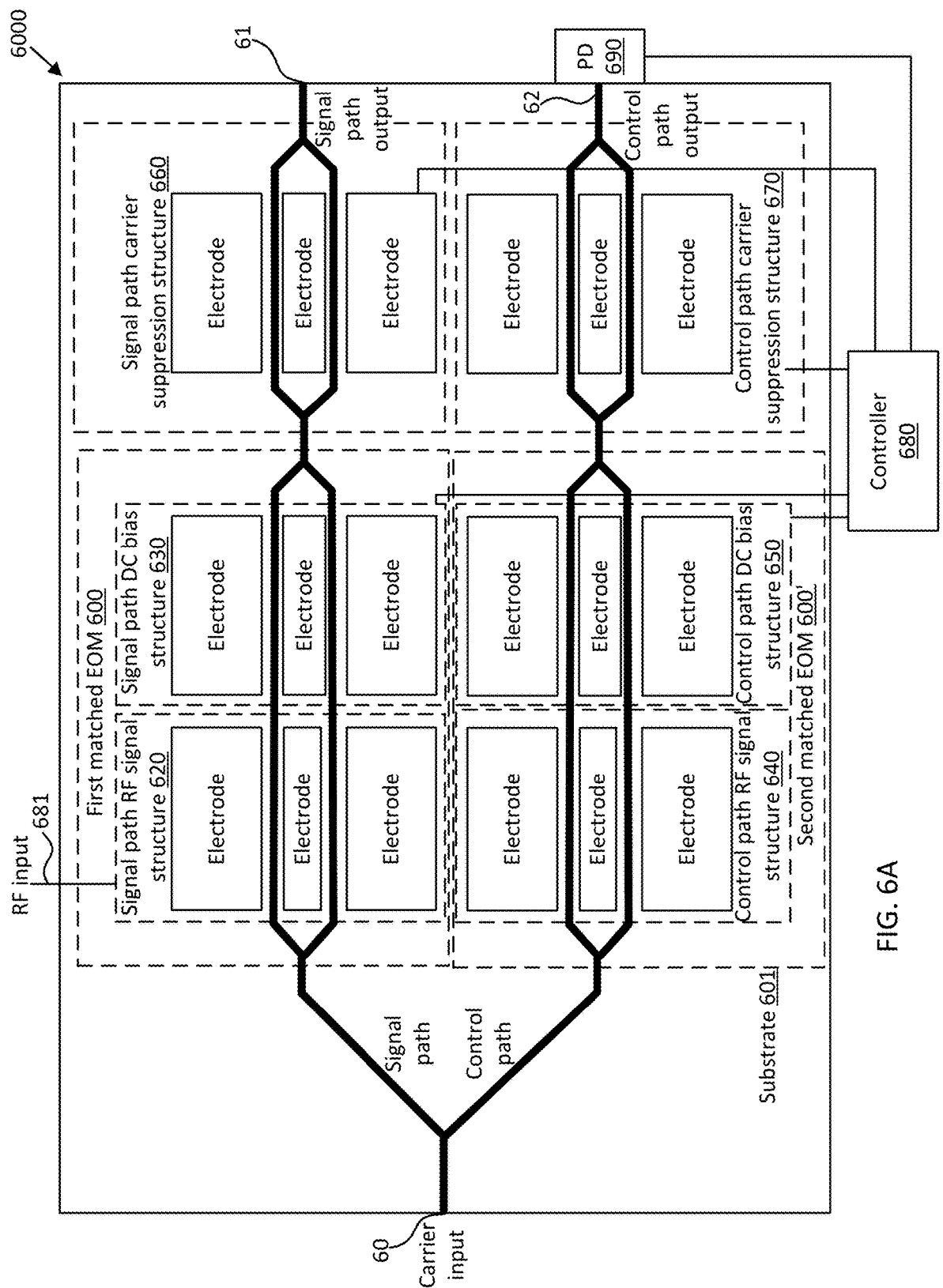
FIG. 6A schematically illustrates a plan view of a circuit including matched EOMs each including an RF signal structure and DC bias structure, and matched signal path carrier suppression structures, according to some examples provided herein.

Although circuits and methods for determining and applying DC bias voltages and carrier suppression voltages may be implemented separately from one another in a manner such as described with reference to FIGS. 2-5, it will be appreciated that they also may be provided in the same circuit as one another. For example, FIG. 6A schematically illustrates a plan view of a circuit 6000 including matched EOMs 600, 600' each including an RF signal structure and a DC bias structure, and matched signal path carrier suppression structures, according to some examples provided herein. In a manner similar to that described with reference to FIG. 2, circuit 6000 illustrated in FIG. 6A includes substrate 601 having an input 60 receiving an optical carrier having a frequency, and a waveguide splitting the input into a signal path having a signal path output 61 and a control path having a control path output 62 (individual segments of the waveguide not specifically labeled). Circuit 6000 further may include, along the signal path, first matched EOM 600 including signal path RF signal structure 620 (including electrodes disposed along the signal path) and signal path DC bias structure 630 (including electrodes disposed along the signal path), and signal path carrier suppression structure 660 (including electrodes disposed along the signal path). Circuit 6000 also may include, along the control path, second matched EOM 600' including control path RF signal structure 640 (including electrodes disposed along the control path) and control path DC bias structure 650 (including electrodes disposed along the control path), and control path carrier suppression structure 670 (including electrodes disposed along the control path). The waveguide may be formed within substrate 601, and the electrodes (not specifically labeled) of signal path RF signal structure 620, signal path DC bias structure 630, signal path carrier suppression structure 660, control path RF signal structure 640, control path DC bias structure 650, and control path carrier suppression structure 670 may be suitably disposed on substrate 601 relative to the waveguide, in a manner such as described with reference to FIG. 1 or otherwise known in the art.

Signal path RF signal structure 620 and signal path DC bias structure 630, control path RF signal structure 640, and control path DC bias structure 650 may be configured in a manner such as described with reference to FIGS. 2 and 3. Signal path carrier suppression structure 660 and control path carrier suppression structure 670 may be configured in a manner such as described with reference to FIGS. 4 and 5. The waveguide may include a junction that interferometrically joins first and second segments of the signal path that pass through signal path RF signal structure 620 and signal path DC bias structure 630, a junction that divides the signal path into third and fourth segments that pass through signal path carrier suppression structure 660, and another junction that interferometrically joins the third and fourth segments of the signal path to the signal path output 41 (waveguide junctions and segments not specifically labeled in FIG. 6A). Additionally, the waveguide may include a junction that interferometrically joins first and second segments of the control path that pass through control path RF signal structure 640 and control path DC bias structure 650, a junction that divides the control path into third and fourth segments that pass through control path carrier suppression structure 670, and another junction that interferometrically joins the third and fourth segments of the control path to the control path output 62.

A radio-frequency (RF) signal, received by RF input 681, may be imposed on the optical carrier in the signal path by applying voltages to the electrodes of signal path RF signal structure 620, resulting in changes in optical intensity at signal path output 61. Although specific details of the connections are omitted from FIG. 6 for simplicity, controller 680 may be coupled to each of the respective electrodes of signal path DC bias structure 630, signal path carrier suppression structure 660, control path DC bias structure 650, and control path carrier suppression structure 670 and configured to apply voltages thereto using instructions stored at controller 680. In a manner such as described in greater detail herein, controller 680 may be configured to use control path DC bias structure 650 to determine DC bias(es) to apply to signal path DC bias structure 630 so as to correct any DC bias in the signal path, even if such DC bias drifts over time in a manner such as described with reference to FIG. 1, and also may be configured to use control path carrier suppression structure 670 to determine carrier suppression voltage(s) to apply to signal path carrier suppression structure 660 so as to suppress the optical carrier frequency, even if such frequency changes over time in a manner such as described with reference to FIG. 1. Controller circuitry 680 may include any suitable combination of hardware (e.g., application specific integrated circuit (ASIC), field programmable gate array (FPGA), central processing unit (CPU), or the like) and software (e.g., instructions causing the hardware to implement the functionality described herein).

Figure 6B:
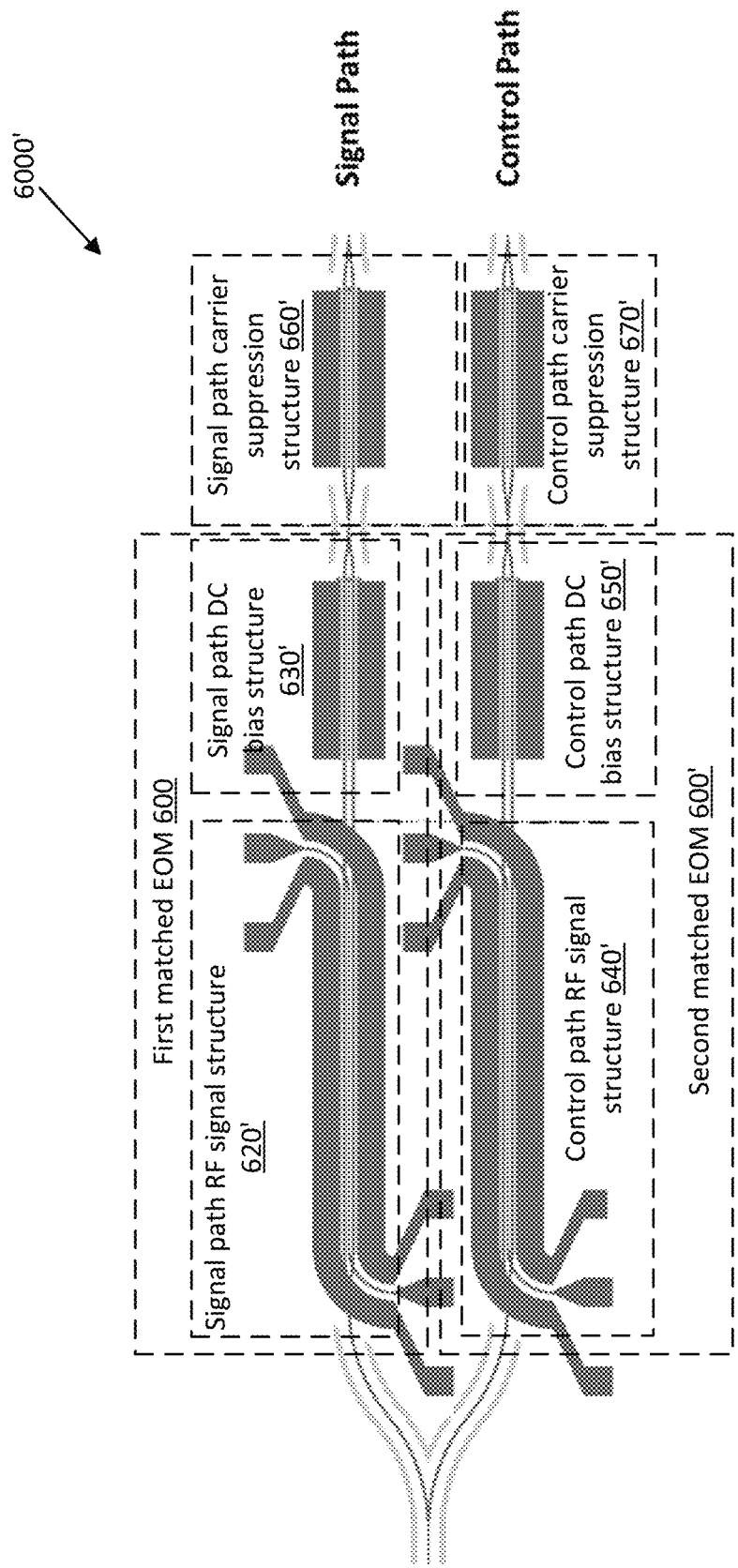
FIG. 6B schematically illustrates a plan view of another circuit including matched EOMs each including an RF signal structure and DC bias structure, and matched signal path carrier suppression structures, according to some examples provided herein.

It will be appreciated that circuit 6000 illustrated in FIG. 6A, and other circuits described herein, may be implemented in any suitable manner. For example, FIG. 6B schematically illustrates a plan view of another circuit 6000' including matched EOMs 600, 600' each including a respective RF signal structure 620', 640' and DC bias structure 630', 650', and matched signal path carrier suppression structures 660', 670', according to some examples provided herein. Although not specifically illustrated, circuit 6000' further includes controller circuitry configured in a manner such as described elsewhere herein.

Figure 7:
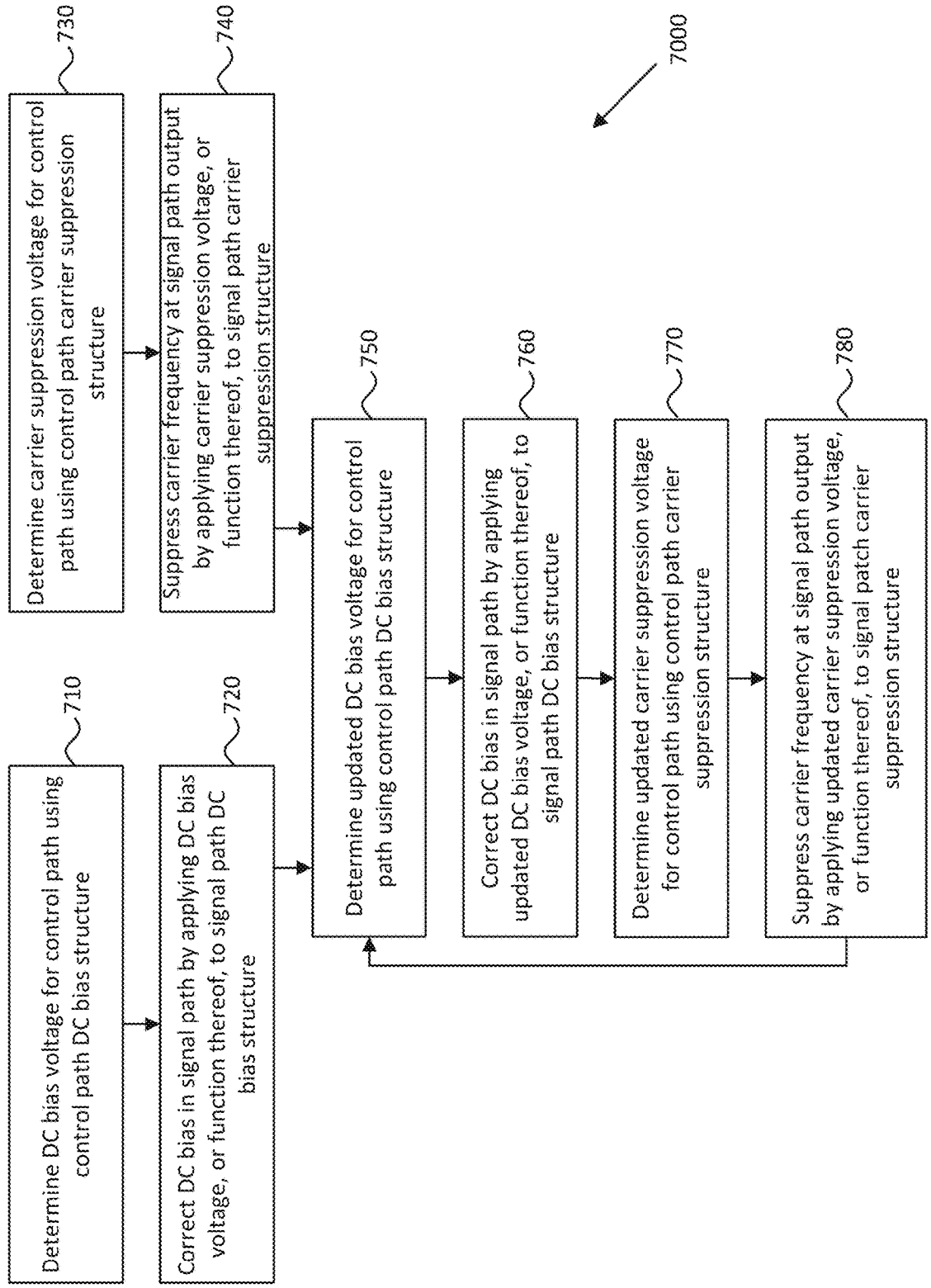
FIG. 7 illustrates a flow of operations in a method for correcting DC bias and suppressing an optical carrier frequency in an EOM, according to some examples provided herein.

FIG. 7 illustrates a flow of operations in a method for dynamically correcting DC bias and suppressing an optical carrier frequency in an EOM, according to some examples provided herein. Method 700 illustrated in FIG. 7 may include determining a DC bias voltage for a control path using a control path DC bias structure (operation 710). For example, controller 680 may determine a DC bias voltage for the control path using control path DC bias structure 650 in a manner similar to that described with reference to FIGS. 2 and 3. Method 700 illustrated in FIG. 7 also may include correcting DC bias in a signal path by applying the DC bias voltage, or a function thereof, to a signal path DC bias structure (operation 720). For example, controller 680 may correct DC bias in the signal path by applying the DC bias voltage, or a function thereof, to signal path DC bias structure 630 in a manner similar to that described with reference to FIGS. 2 and 3. Method 700 illustrated in FIG. 7 also may include determining a carrier suppression voltage for the control path using a control path carrier suppression structure (operation 730). For example, controller 680 may determine a carrier suppression voltage for the control path using control path carrier suppression structure 670 in a manner similar to that described with reference to FIGS. 4 and 5. Method 700 illustrated in FIG. 7 also may include suppressing a carrier frequency at a signal path output by applying the carrier suppression voltage, or a function thereof, to a signal path carrier suppression structure (operation 740). For example, controller 680 may apply the carrier suppression voltage, or a function thereof, to signal path carrier suppression structure 660 in a manner similar to that described with reference to FIGS. 4 and 5. Note that operations 710 and 730 may be performed in any suitable order relative to one another, and similarly that operations 720 and 740 may be performed in any suitable order relative to one another.

Method 700 illustrated in FIG. 7 also may include determining an updated DC bias voltage for the control path using the control path DC bias structure (operation 750), and correcting the DC bias in the signal path by applying the updated DC bias voltage, or a function thereof, to the signal path DC bias structure (operation 760). For example, controller 680 may periodically recalibrate the DC bias voltage for the control path, and then apply the resulting updated DC bias voltage to both the control path and the signal path, in a manner similar to that described with reference to FIGS. 2 and 3. Note that the DC bias voltage applied in operation 760 may be the same as, or different than, the DC bias voltage applied in operation 720, depending on any drift that may have occurred within circuit 6000 between the time at which operation 720 is performed and the time at which operation 760 is performed.

Method 7000 illustrated in FIG. 7 also may include determining an updated carrier suppression voltage for the control path using the control path carrier suppression structure (operation 770) and suppressing the carrier frequency at the signal path output by applying the updated carrier suppression voltage, or a function thereof, to the signal path carrier suppression structure (operation 780). For example, controller 680 may periodically recalibrate the carrier suppression voltage for the control path, and then apply the resulting updated carrier suppression voltage to both the control path and the signal path, in a manner similar to that described with reference to FIGS. 4 and 5. Note that the carrier suppression voltage applied in operation 770 may be the same as, or different than, the carrier suppression voltage applied in operation 740, depending on any changes that may have occurred within the source of the optical carrier, or other changes to the signal path or control path, between the time at which operation 740 is performed and the time at which operation 770 is performed. Note that operations 750 and 770 may be performed in any suitable order relative to one another, and similarly that operations 760 and 780 may be performed in any suitable order relative to one another.

Figure 8A:
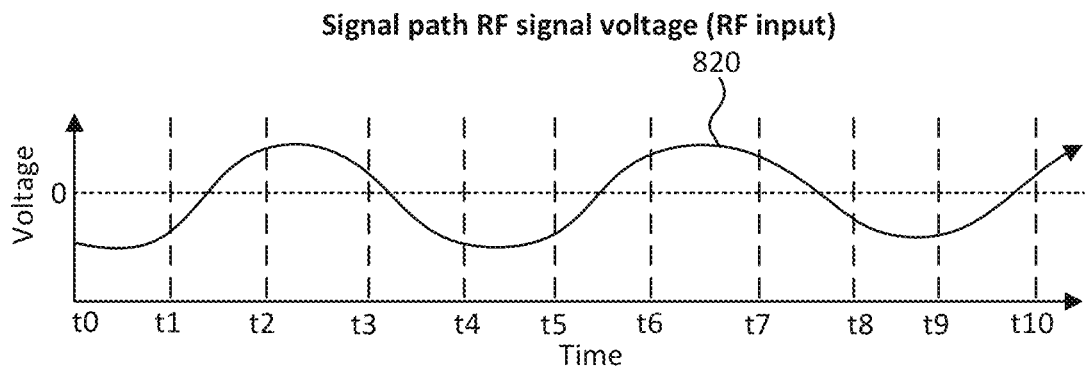
FIGS. 8A-8F are notional timing diagrams for voltages that may be applied in the circuits of FIGS. 2, 4, and 6A-6B and in the methods of FIGS. 3, 5, and 7, according to some examples provided herein.
Figure 8B:
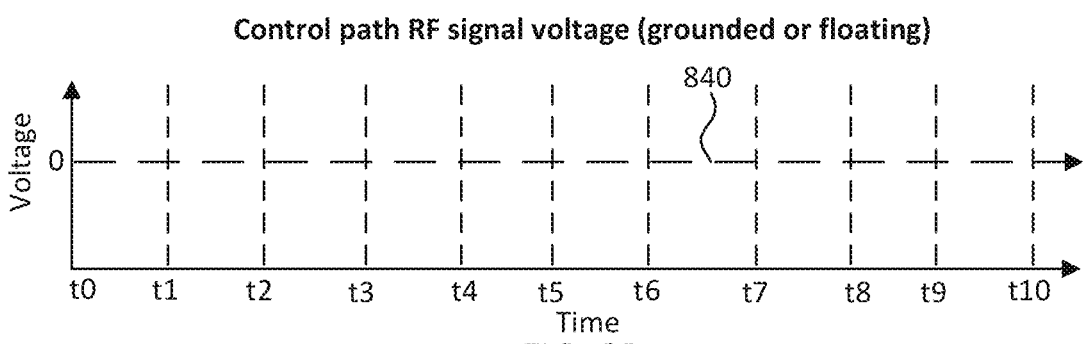
Figure 8C:
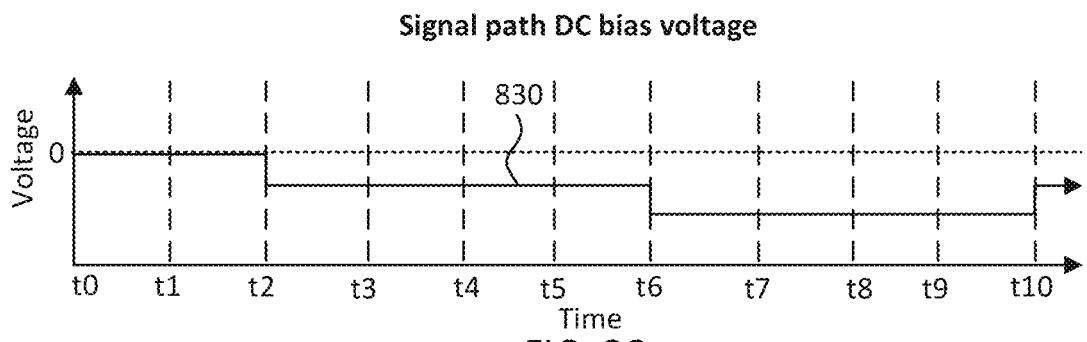
Figure 8D:
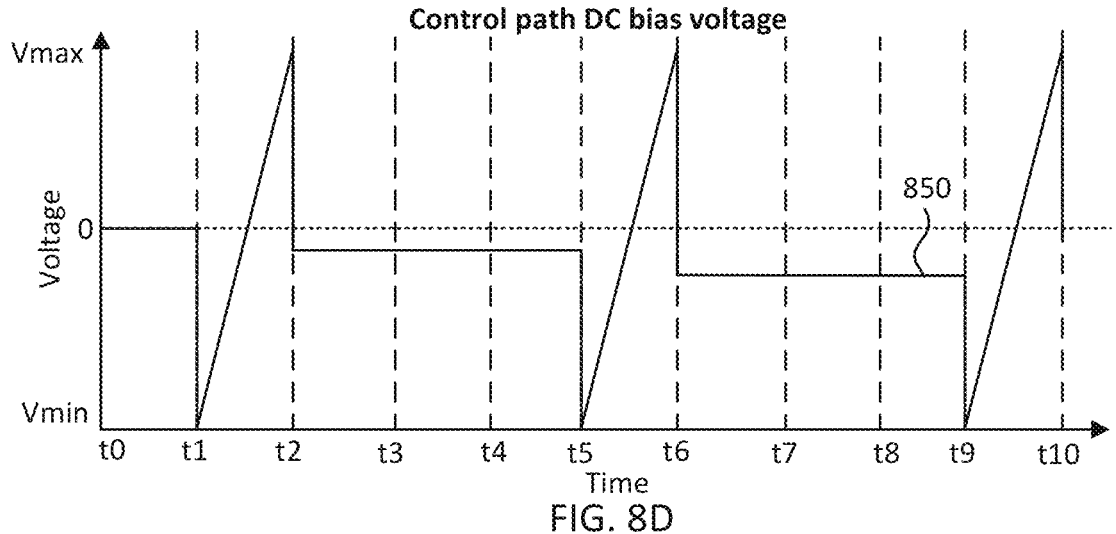
Figure 8E:
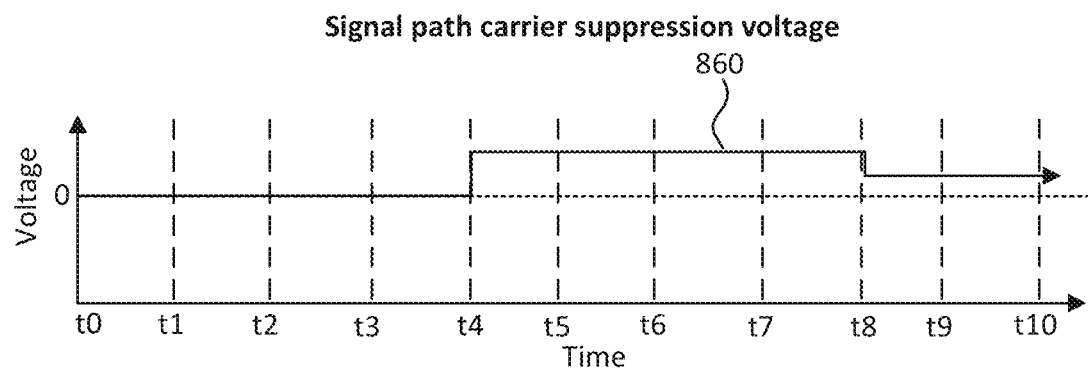
Figure 8F:
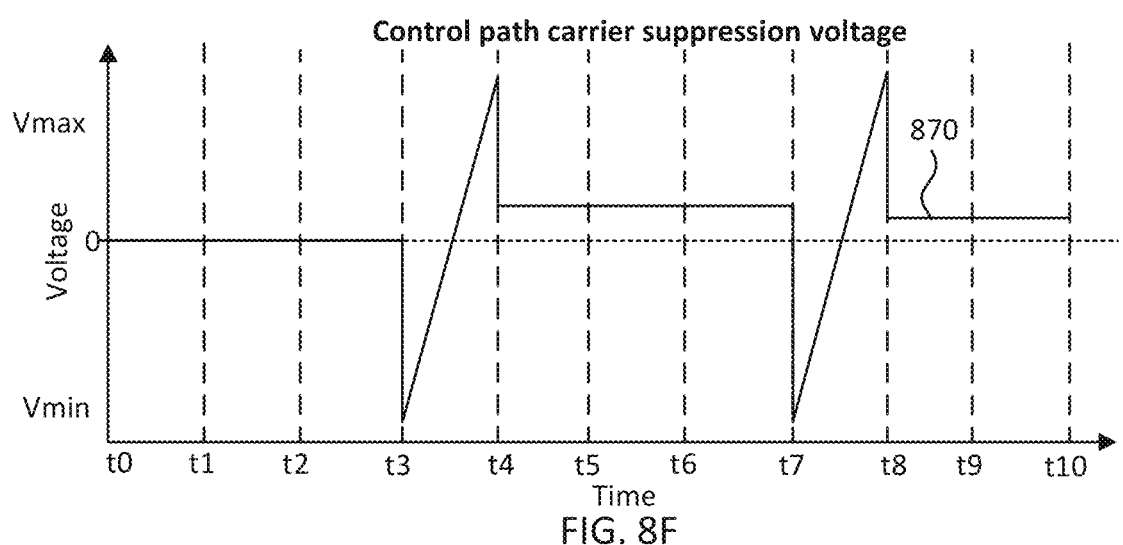

FIGS. 8A-8F are a notional timing diagrams for voltages that may be applied in the circuits of FIGS. 2, 4, and 6A-6B and in the methods of FIGS. 3, 5, and 7, according to some examples provided herein. More specifically, FIG. 8A illustrates example signal path RF signal voltage (RF input) 820 that may be applied as input to signal path RF signal structure 220, 420, or 620 so as to impose the RF signal on the optical carrier; FIG. 8B illustrates example control path RF signal voltage 840 that may be applied to control path RF signal structure 240, 440, or 640, which may be grounded or may be allowed to float (e.g., may be disconnected from controller circuitry); FIG. 8C illustrates example signal path DC bias voltage 830 that controller circuitry may apply to signal path DC bias structure 230 or 630 so as to offset DC bias within EOM 220 or 620; FIG. 8D illustrates example control path DC bias voltage 850 that controller circuitry may apply to control path DC bias structure 240 or 640 so as to determine the DC bias voltage which then is applied both to control path DC bias structure 240 or 640 and signal path DC bias structure 230 or 630; FIG. 8E illustrates example signal path carrier suppression voltage 860 that controller circuitry may apply to signal path carrier suppression structure 460 or 660 so as to suppress the carrier frequency at the output of circuit 4000 or 6000; and FIG. 8F illustrates example control path carrier suppression voltage 870 that controller circuitry may apply to control path carrier suppression structure 470 or 670 so as to determine the carrier suppression voltage which then is applied both to control path carrier suppression structure 470 or 670 and signal path carrier suppression structure 460 or 660. It will be appreciated that depending on the particular implementation, not all signals necessarily are used. For example, voltages 860 and 870 may not necessarily be applicable to circuit 2000 or method 300 unless modified so as to also include signal path carrier suppression structure or operations, while voltages 830 and 850 may not necessarily be applicable to circuit 4000 or method 500 unless modified so as to also include signal path DC bias structure or operations.

In FIG. 8A, it may be seen that signal path RF signal voltage 820 may be continuously varied in accordance with the RF signal, and is not changed during, or in response to, calibration or setting of signal path DC bias voltage 830 using control path DC bias voltage 850 and/or calibration or setting of carrier suppression voltage 860 using control path carrier suppression voltage 870. Voltage 820 may oscillate about a voltage of zero volts in a manner such as suggested in FIG. 8A. Control path RF signal voltage 840 illustrated in FIG. 8B may be allowed to float (as suggested by the dashed line in FIG. 8B), or may be tied to ground.

In the example illustrated in FIG. 8D, control path DC bias voltage 850 may begin at a fixed value (such as 0 volts) at time t0, e.g., based on a factory calibration, and then rapidly ramped between time t1 and time t2 which causes sinusoidal fluctuations in intensity at the photodetector coupled to the control path output of the circuit. Illustratively, voltage 850 may be rapidly ramped between a negative minimum voltage (Vmin) and a positive maximum voltage (Vmax). Based on the resulting optical intensity variations fluctuations, the controller circuitry determines a DC bias voltage that would place the intensity at the quadrature point of the sinusoid, corresponding to operation 310 or 710, and applies that signal path DC bias voltage 830 to the signal path DC bias structure, corresponding to operation 320 or 720, as well as the control path DC bias structure as voltage 850, beginning at time t2. After a period of time, e.g., a predetermined number of temporal units, the control path DC bias voltage 850 may be used to recalibrate the signal path DC bias voltage 830. For example, the control path DC bias voltage 850 may be ramped rapidly between time t5 and time t6 which causes sinusoidal fluctuations in intensity at the photodetector coupled to the control path output of the circuit. Based on those fluctuations, the controller circuitry determines an updated DC bias voltage that would place the intensity at the quadrature point of the sinusoid, corresponding to operation 340 or 750, and applies that signal path DC bias voltage 830 to the signal path DC bias structure, corresponding to operation in 350 or 760, as well as the control path DC bias structure as voltage 850, beginning at time t6. After another period of time, e.g., another predetermined number of temporal units, the control path DC bias voltage 850 may be used to again recalibrate the signal path DC bias voltage 830. For example, the control path DC bias voltage may be ramped rapidly between time t9 and time t10 which causes sinusoidal fluctuations in intensity at the photodetector coupled to the control path output of the circuit. Based on those fluctuations, the controller circuitry determines an updated DC bias voltage that would place the intensity at the quadrature point of the sinusoid, corresponding to operation 340 or 750, and applies that signal path DC bias voltage 830 to the signal path DC bias structure, corresponding to operation 350 or 760, as well as the control path DC bias structure as voltage 850, beginning at time t10.

Such a sequence of operations may be repeated any suitable number of times, and indeed may be repeated throughout the lifetime of the circuit so as to maintain an appropriate DC bias voltage for the circuit despite any drift that may occur within that circuit. It should be appreciated that for the majority of the time, e.g., for at least about 60% of the time, at least about 70% of the time, at least about 80% of the time, at least about 90% of the time, at least about 95% of the time, at least about 99% of the time, at least about 99.9% of the time, or even at least about 99.99% of the time, the control path DC bias voltage 850 and signal path DC bias voltage 830 may be approximately the same as one another. As such, the control path and signal path may have approximately the same experience as one another such that signal path DC bias voltage 830 may be expected to reliably offset DC bias on the signal path using control path DC bias voltage 850, or a function thereof, even after numerous calibration cycles, e.g., after 10 or more calibration cycles, 100 or more calibration cycles, 1000 or more calibration cycles, 10,000 or more calibration cycles, 100,000 or more calibration cycles, or even 1,000,000 or more calibration cycles.

Additionally, or alternatively, in the illustrated example, control path carrier suppression voltage 870 may begin at a fixed value (e.g., zero volts) at time t0, e.g., based on a factory calibration, and then rapidly ramped between time t3 and time t4 which causes sinusoidal fluctuations in intensity at the photodetector coupled to the control path output of the circuit, or at any other suitable time that does not overlap with the time (if any) at which the control path DC bias voltage is ramped. Illustratively, voltage 870 may be rapidly ramped between a negative minimum voltage (Vmin) and a positive maximum voltage (Vmax), which may be the same or different than the maximum and minimum voltages described with reference to FIG. 8D. Based on fluctuations caused by ramping the control path carrier suppression voltage 870, the controller circuitry determines a carrier suppression voltage that would minimize the intensity of the sinusoid, corresponding to operation 510 or 730, and applies that as signal path carrier suppression voltage 860 to the signal path carrier suppression structure, corresponding to operation 520 or 740, as well as to the control path carrier suppression structure as control path carrier suppression voltage 870, beginning at time t4. After a period of time, e.g., a predetermined number of temporal units, the control path carrier suppression voltage 870 may be used to recalibrate the signal path carrier suppression voltage 860. For example, the control path carrier suppression voltage may be ramped rapidly between time t7 and time t8 which causes sinusoidal fluctuations in intensity at the photodetector coupled to the control path output of the circuit. Based on those fluctuations, the controller circuitry determines an updated carrier suppression voltage that would minimize the intensity of the sinusoid, corresponding to operation 540 or 770, and applies that as signal path carrier suppression voltage 860 to the signal path carrier suppression structure, corresponding to operation 550 or 780, as well as the control path carrier suppression structure as voltage 870, beginning at time t8.

Such a sequence of operations may be repeated any suitable number of times, and indeed may be repeated throughout the lifetime of the circuit so as to maintain an appropriate carrier suppression voltage for the circuit despite any changes that may occur to that circuit or to the source of the optical carrier. The periodicity with which the signal path carrier suppression voltage 860 is recalibrated need not necessarily be the same periodicity with which the signal path DC bias voltage 830 is recalibrated. It should be appreciated that for the majority of the time, e.g., for at least about 60% of the time, at least about 70% of the time, at least about 80% of the time, at least about 90% of the time, at least about 95% of the time, at least about 99% of the time, at least about 99.9% of the time, or even at least about 99.99% of the time, the control path carrier suppression voltage 870 and signal path carrier suppression voltage 860 may be approximately the same as one another. As such, the control path and signal path may have approximately the same experience as one another such that signal path carrier suppression voltage 860 may be expected to reliably suppress the carrier frequency on the signal path using control path carrier suppression voltage 870, or a function thereof, even after numerous calibration cycles, e.g., after 10 or more calibration cycles, 100 or more calibration cycles, 1000 or more calibration cycles, 10,000 or more calibration cycles, 100,000 or more calibration cycles, or even 1,000,000 or more calibration cycles.

Additionally, the frequency with which the calibration of the DC bias voltage and/or carrier suppression voltage may be varied, e.g., depending upon the magnitudes of the changes in the calibrated voltage(s). Illustratively, if large changes are observed, then the frequency of the calibration may be increased.

Accordingly, it may be understood that the present circuits and methods provide for rapid detection and control of an appropriate DC bias voltage and/or carrier suppression voltage for an EOM. Such voltages may be determined using calibration data extracted from a control path, and applied to a signal path which need not be taken out of service, and may not be detrimentally affected at all, during the calibration. The calibration of the control path is, and remains during the life of the circuit, applicable to the signal path because the signal path and control path are matched, co-located, and co-excited such that they exhibit the same behavior and calibration data. This capability extracts the salient calibration data using out-of-band methods that may not impact the signal path, and indeed may provide precise control of the signal path without introducing the deleterious effects that the act of extracting calibration data from a signal path otherwise may impart on the signal path's SFDR and SNR.

While preferred embodiments of the invention are described herein, it will be apparent to one skilled in the art that various changes and modifications may be made. For example, it will be appreciated that the present circuits and methods may be implemented in any suitable kind of information system utilizing an EOM, such as terrestrial fiber communication, telecom, data center, metro, long haul communications, terrestrial radio-over-fiber (RoF), present and next-generation cellular networks, internet of things, smart cities, dense WiFi, and the like. The appended claims are intended to cover all such changes and modifications that fall within the true spirit and scope of the invention.

What is claimed is:

1. A circuit, comprising:
a substrate comprising:
an input receiving an optical carrier having a frequency; and
a waveguide splitting the input into a signal path having a signal path output and a control path having a control path output;
a first electro-optic modulator (EOM) comprising:
a signal path radio-frequency (RF) structure comprising electrodes disposed along the signal path and configured to receive voltages to impose an RF signal on the optical carrier in the signal path; and
a signal path DC bias structure comprising electrodes disposed along the signal path;
a second EOM comprising:
a control path RF signal structure comprising electrodes disposed along the control path; and
a control path DC bias structure comprising electrodes disposed along the control path;
a photodetector coupled to the control path output; and
a controller comprising circuitry configured to:
determine a DC bias voltage for the control path using changes in optical intensity at the photodiode caused by applying voltages to the electrodes of the control path DC bias structure; and
correct DC bias in the signal path by applying the DC bias voltage, or a function thereof, to the electrodes of the signal path DC bias structure.

2. The circuit of claim 1, wherein the control path RF signal structure and the control path RF signal structure have approximately the same dimensions, materials, and manufacturing process as one another, and wherein the signal path DC bias structure and the control path DC bias structure have approximately the same dimensions, materials, and manufacturing process as one another.

3. The circuit of claim 1, wherein the signal path and the control path have approximately the same phase velocity, local temperature, and charge accumulation characteristics as one another.

4. The circuit of claim 1, wherein the optical carrier is asymmetrically split between the signal path and the control path.

5. The circuit of claim 1, wherein the signal path DC bias structure is disposed between the signal path RF structure and the signal path output, and wherein the control path DC bias structure is disposed between the control path RF signal structure and the control path output.

6. The circuit of claim 1, wherein the circuitry of the controller is configured to periodically determine an updated DC bias voltage for the control path using the control path DC bias structure, and to correct any drift in the DC bias in the signal path by applying the updated DC bias voltage, or a function thereof, to the signal path DC bias structure.

7. The circuit of claim 1, further comprising a signal path carrier suppression structure comprising electrodes along the signal path and a control path carrier suppression structure comprising electrodes along the control path, wherein the circuitry of the controller further is configured to:
determine a carrier suppression voltage for the control path using changes in optical intensity at the photodiode caused by applying voltages to the electrodes of the control path carrier suppression structure; and
dynamically suppress the frequency of the optical carrier at the signal path output by applying the carrier suppression voltage, or a function thereof, to the electrodes of the signal path carrier suppression structure.

8. The circuit of claim 1, wherein the waveguide comprises a junction splitting the signal path into first and second sections and a junction combining the first and second sections into the signal path output, a first one of the electrodes of the signal path RF signal structure being between the first and second sections, a second one of the electrodes of the signal path RF signal structure being outside the first section, and a third one of the electrodes of the signal path RF signal structure being outside the second section, and
a first one of the electrodes of the signal path DC bias structure being between the first and second sections, a second one of the electrodes of the signal path DC bias structure being outside the first section, and a third one of the electrodes of the signal path DC bias structure being outside the second section; and
wherein the waveguide further comprises a junction splitting the control path into first and second sections and a junction combining the first and second sections into the signal path output, a first one of the electrodes of the control path RF signal structure being between the first and second sections, a second one of the electrodes of the control path RF signal structure being outside the first section, and a third one of the electrodes of the control path RF signal structure being outside the second section, and
a first one of the electrodes of the control path DC bias structure being between the first and second sections, a second one of the electrodes of the control path DC bias structure being outside the first section, and a third one of the electrodes of the control path DC bias structure being outside the second section.

9. A circuit, comprising:
a substrate comprising:
an input receiving an optical carrier having a frequency; and
a waveguide splitting the input into a signal path having a signal path output and a control path having a control path output;
a first electro-optic modulator (EOM) comprising a signal path radio frequency (RF) signal structure comprising electrodes disposed along the signal path and configured to receive voltages to impose an RF signal on the optical carrier in the signal path;
a signal path carrier suppression structure comprising electrodes disposed along the signal path;
a second EOM comprising a control path RF signal structure comprising electrodes disposed along the control path;
a control path carrier suppression structure comprising electrodes disposed along the control path;
a photodetector coupled to the control path output; and
a controller comprising circuitry configured to:
determine a carrier suppression voltage for the control path using changes in optical intensity at the photodiode caused by applying voltages to the electrodes of the control path carrier suppression structure; and
suppress the frequency of the optical carrier at the signal path output by applying the carrier suppression voltage to the electrodes of the signal path carrier suppression structure.

10. The circuit of claim 9, wherein the signal path RF signal structure and the control path RF signal structure have approximately the same dimensions, materials, and manufacturing process as one another, and wherein the signal path carrier suppression structure and the control path carrier suppression structure have approximately the same dimensions, materials, and manufacturing process as one another.

11. The circuit of claim 9, wherein the signal path and the control path have approximately the same phase velocity, local temperature, and charge accumulation characteristics as one another.

12. The circuit of claim 9, wherein the optical carrier is asymmetrically split between the signal path and the control path.

13. The circuit of claim 9, wherein the signal path carrier suppression structure is disposed between the signal path RF signal structure and the signal path output, and wherein the control path carrier suppression structure is disposed between the control path RF signal structure and the control path output.

14. The circuit of claim 9, wherein the circuitry of the controller is configured to periodically determine an updated carrier suppression voltage using the control path carrier suppression structure, and to correct any changes to the optical carrier frequency at the signal path output by applying the updated carrier suppression voltage, or a function thereof, to the signal path carrier suppression structure.

15. The circuit of claim 9, further comprising a signal path DC bias structure comprising electrodes along the signal path and a control path DC bias structure comprising electrodes along the control path, wherein the circuitry of the controller further is configured to:
determine a DC bias voltage using changes in optical intensity at the photodiode caused by applying voltages to the electrodes of the control path DC bias structure; and
correct DC bias in the EOM by applying the DC bias voltage, or a function thereof, to the electrodes of the signal path DC bias structure.

16. The circuit of claim 9, wherein the waveguide further comprises a junction splitting the signal path into first and second sections and a junction combining the first and second sections into the signal path output, a first one of the electrodes of the signal path RF signal structure being between the first and second sections, a second one of the electrodes of the signal path RF signal structure being outside the first section, and a third one of the electrodes of the signal path RF signal structure being outside the second section, and a first one of the electrodes of the signal path carrier suppression structure being between the first and second sections, a second one of the electrodes of the signal path carrier suppression structure being outside the first section, and a third one of the electrodes of the signal path carrier suppression structure being outside the second section; and wherein the waveguide further comprises a junction splitting the control path into first and second sections and a junction combining the first and second sections into the signal path output, a first one of the electrodes of the control path RF signal structure being between the first and second sections, a second one of the electrodes of the control path RF signal structure being outside the first section, and a third one of the electrodes of the control path RF signal structure being outside the second section, and a first one of the electrodes of the control path carrier suppression structure being between the first and second sections, a second one of the electrodes of the control path carrier suppression structure being outside the first section, and a third one of the electrodes of the control path carrier suppression structure being outside the second section.

17. A method, comprising:
determining a DC bias voltage for a control path using a control path DC bias structure;
correcting DC bias in a signal path by applying the DC bias voltage, or a function thereof, to a signal path DC bias structure;
operating a signal path radio-frequency (RF) signal structure and a control path RF signal structure for a time period during which DC biases in the signal path and in the control path drift;
determining an updated DC bias voltage for the control path using the control path DC bias structure; and
correcting the drift of the DC bias in the signal path by applying the updated DC bias voltage, or a function thereof, to the signal path DC bias structure.

18. The method of claim 17, wherein the signal path DC bias structure and the signal path RF signal structure are disposed along a signal path provided by a waveguide within a substrate, and wherein the control path DC bias structure and the control path RF signal structure are disposed along a control path provided by the waveguide within the substrate.

19. A method, comprising:
determining a carrier suppression voltage for a control path using a control path carrier suppression structure;
suppressing a carrier frequency at a signal path output by applying the carrier suppression voltage, or a function thereof, to a signal path carrier suppression structure;
operating a signal path radio-frequency (RF) signal structure for a time period during which the carrier frequency changes or carrier suppression voltages in the signal path or in the control path otherwise drift;
determining an updated carrier suppression voltage for the control path using the control path carrier suppression structure; and
suppressing the carrier frequency at the signal path output by applying the updated carrier suppression voltage, or a function thereof, to the signal path carrier suppression structure.

20. The method of claim 19, wherein the signal path carrier suppression structure and the signal path RF signal structure are disposed along a signal path provided by a waveguide within a substrate, and wherein the control path carrier suppression structure and the control path RF signal structure are disposed along a control path provided by the waveguide within the substrate.

21. A method, comprising:
determining a DC bias voltage for a control path using a control path DC bias structure;
correcting DC bias in a signal path by applying the DC bias voltage, or a function thereof, to a signal path DC bias structure;
determining a carrier suppression voltage for the control path using a control path carrier suppression structure;
suppressing a carrier frequency at a signal path output by applying the carrier suppression voltage, or a function thereof, to a signal path carrier suppression structure;
determining an updated DC bias voltage for the control path using the control path DC bias structure;
correcting the DC bias in the signal path by applying the updated DC bias voltage, or a function thereof, to the signal path DC bias structure;
determining an updated carrier suppression voltage for the control path using the control path carrier suppression structure; and
suppressing the carrier frequency at the signal path output by applying the updated carrier suppression voltage, or a function thereof, to the signal path carrier suppression structure.

* * * * *